(12) United States Patent
Lee et al.

(10) Patent No.: US 8,400,389 B2
(45) Date of Patent: Mar. 19, 2013

(54) LIQUID CRYSTAL DISPLAY HAVING COMMON VOLTAGE INPUT PADS CONNECTED TO DUMMY CHANNELS

(75) Inventors: Jaekyun Lee, Suwon-Si (KR); Jaeyoung Oh, Goyang-si (KR); Dongsu Shin, Anyang-Si (KR); Daejung Choi, Paju-Si (KR)

(73) Assignee: LG Display Co., Ltd., Seoul (KR)

( * ) Notice: Subject to any disclaimer, the term of this patent is extended or adjusted under 35 U.S.C. 154(b) by 446 days.

(21) Appl. No.: 12/608,691

(22) Filed: Oct. 29, 2009

(65) Prior Publication Data
US 2010/0109994 A1    May 6, 2010

(30) Foreign Application Priority Data
Oct. 30, 2008    (KR) .................. 10-2008-0107356

(51) Int. Cl.
G09G 3/36    (2006.01)
(52) U.S. Cl. ...................................... 345/100
(58) Field of Classification Search ............. 345/100
See application file for complete search history.

(56) References Cited

U.S. PATENT DOCUMENTS

| | | | | |
|---|---|---|---|---|
| 5,457,552 A * | 10/1995 | Ogurtsov et al. | ............. | 349/54 |
| 7,545,356 B2 * | 6/2009 | HoeSup | ............. | 345/94 |
| 8,035,662 B2 * | 10/2011 | Yajima et al. | ............. | 345/690 |
| 2001/0015715 A1* | 8/2001 | Hebiguchi et al. | ............. | 345/92 |
| 2001/0019320 A1* | 9/2001 | Lee et al. | ............. | 345/87 |
| 2002/0070905 A1* | 6/2002 | Kodate et al. | ............. | 345/55 |
| 2003/0227590 A1 | 12/2003 | Oke et al. | | |
| 2004/0183768 A1* | 9/2004 | Yamato et al. | ............. | 345/98 |
| 2005/0139837 A1 | 6/2005 | Lee et al. | | |
| 2006/0001789 A1 | 1/2006 | Ahn | | |
| 2006/0284816 A1* | 12/2006 | Jang et al. | ............. | 345/98 |
| 2007/0164964 A1* | 7/2007 | Ha | ............. | 345/98 |
| 2008/0117234 A1 | 5/2008 | Yajima et al. | | |
| 2010/0001973 A1* | 1/2010 | Hotelling et al. | ............. | 345/174 |
| 2010/0144391 A1* | 6/2010 | Chang et al. | ............. | 455/566 |

FOREIGN PATENT DOCUMENTS

| | | |
|---|---|---|
| CN | 101000414 A | 7/2007 |
| CN | 101004520 A | 7/2007 |
| EP | 1 023 195 A1 | 2/2009 |
| KR | 10-2007-0080143 A | 8/2007 |

\* cited by examiner

*Primary Examiner* — Chanh Nguyen
*Assistant Examiner* — Roy Rabindranath
(74) *Attorney, Agent, or Firm* — Birch, Stewart, Kolasch & Birch, LLP

(57) ABSTRACT

A liquid crystal display is provided. The liquid crystal display includes an edge common line receiving a common voltage through input sources, a plurality of pixel common line patterns that are formed in each of liquid crystal cells constituting each pixel and are electrically connected to one another, and a plurality of longitudinal common lines that are electrically connected to the edge common line to apply the common voltage to the pixel common line patterns. The pixel common line patterns are connected to common electrodes of the liquid crystal cells. Each of the longitudinal common lines is formed between two horizontally adjacent pixels in a direction parallel to data lines. The pixels includes a plurality of pixel units each including two vertically adjacent pixels, and two data lines and three gate lines are assigned to each of the pixel units.

11 Claims, 21 Drawing Sheets

Crosstalk phenomenon

Generation of luminance difference

LIQUID CRYSTAL DISPLAY HAVING COMMON VOLTAGE INPUT PADS CONNECTED TO DUMMY CHANNELS

This application claims the benefit of Korea Patent Application No. 10-2008-0107356 filed on Oct. 30, 2008, the entire contents of which is incorporated herein by reference for all purposes as if fully set forth herein.

BACKGROUND OF THE INVENTION

1. Field of the Invention

Embodiments of the invention relate to a liquid crystal display capable of reducing a distortion of a common voltage.

2. Discussion of the Related Art

Active matrix type liquid crystal displays display a moving picture using a thin film transistor (TFT) as a switching element. The active matrix type liquid crystal displays have been implemented in televisions as well as display devices in portable devices, such as office equipment and computers, because of the thin profile of an active matrix type liquid crystal displays. Accordingly, cathode ray tubes (CRT) are being rapidly replaced by active matrix type liquid crystal displays.

In the active matrix type liquid crystal displays, a data voltage is applied to a pixel electrode, and a common voltage is applied to a common electrode opposite the pixel electrode. The common electrodes are connected in parallel to common lines. Liquid crystal cells are driven by the voltages applied to the pixel electrodes and the common electrodes.

However, the common voltage is easily distorted by a resistance of the common line or a deviation of the common voltage over the entire surface of a liquid crystal display panel depending on a structure of the common line. For example, in a liquid crystal display in which as many common lines as the number of horizontal lines (i.e., a vertical resolution) are formed parallel to gate lines, because a data voltage is simultaneously applied to pixels of 1 horizontal line through the supply of scan pulses, a load of the common line opposite the pixels increases. Because the load of the common line depnds on an amount of RC delay defined by a multiplication of a resistance and a parasitic capacitance of the common line, the resistance of the common line has to be reduced so as to reduce the amount of RC delay. However, as shown in FIG. 1, because a related art liquid crystal display has a structure to receive a common voltage Vcom through only two input sources, it is limited to a reduction in resistances of common lines. As a result, in the related art liquid crystal display, as shown in FIG. 2A, the common voltage Vcom is not kept constant and is affected by a scan pulse SP or a data voltage Vdata. Hence, a ripple phenomenon is generated in the common voltage Vcom. The ripple of the common voltage Vcom is a main cause generating a horizontal crosstalk when a specific data pattern is displayed on the screen as shown in FIG. 3A.

In the related art liquid crystal display, the resistance of the common line increases because of the structure of the common line shown in FIG. 1, as the common line goes from right and left sides to a middle portion of the liquid crystal display panel. Therefore, as shown in FIG. 2B, a deviation of the common voltage Vcom over the entire surface of the liquid crystal display panel is caused. The deviation of the common voltage Vcom, as shown in FIG. 3B, causes a luminance difference between upper and lower portions of the liquid crystal display panel and a flicker, and also accumulates a DC component inside the panel to cause image sticking. In most of liquid crystal displays, common lines formed at edges (i.e., a non-display area outside a pixel array) of a panel have wide width so as to reduce resistances of the common lines. However, it is limited to a reduction in the resistances of the common lines because of the limited size of the non-display area. Further, there is a relatively large deviation among resistances of the common lines depending on locations of the common lines.

Further, because as many data lines as horizontal resolution×3 are required in the related art liquid crystal display, it is difficult to reduce the number of data drive integrated circuits (ICs). For example, if a horizontal resolution is 1920, 6 data drive ICs each having 960 channels for driving 5760 data lines are needed. Recently, methods for driving a liquid crystal display panel using data lines less than the number of data lines required to achieve a necessary resolution have been proposed. However, the methods cause several problems such as a difficulty in an increase in an aperture ratio resulting from excessive heat generation inside data drive ICs, readability reduction and visibility reduction, and a defect in longitudinal lines resulting from a reduction in charge time. Because the data drive IC is much more expensive than other elements, it is important to reduce the number of data drive ICs for reducing the manufacturing cost. Accordingly, a method capable of reducing the number of data drive ICs while solving the above-described problems is demanded.

Further, because as many common lines as the number of horizontal lines and as many data lines as horizontal resolution×3 are needed in the related art liquid crystal display, it is limited to an increase in a luminance by increasing an aperture ratio of a pixel array.

SUMMARY OF THE INVENTION

Embodiments of the invention provide a liquid crystal display capable of reducing a distortion of a common voltage by optimally disposing common lines.

Embodiments of the invention also provide a liquid crystal display capable of reducing the number of data drive ICs without causing excessive heat generation or a reduction in image quality.

Embodiments of the invention also provide a liquid crystal display capable of increasing an aperture ratio of a pixel array.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect, there is a liquid crystal display comprising a liquid crystal display panel including a display area where pixels are arranged in a matrix format and a plurality of data lines and a plurality of gate lines are formed to cross each other, an edge common line that is formed in a non-display area outside the display area to receive a common voltage through a plurality of input sources, a plurality of pixel common line patterns that are formed in each of liquid crystal cells constituting each of the pixels and are electrically connected to one another, each of the pixel common line patterns having a mesh structure, the pixel common line patterns being connected to common electrodes of the liquid crystal cells, and a plurality of longitudinal common lines that are electrically connected to the edge common line to apply the common voltage to the pixel common line patterns, each of the longitudinal common lines being formed between two horizontally adjacent pixels in a direction parallel to the data lines, wherein the pixels includes a plurality of pixel units each including two vertically adjacent pixels, and two data lines and three gate lines are assigned to each of the pixel units.

The liquid crystal display further comprises a plurality of data drive integrated circuits (ICs) for driving the data lines, wherein the plurality of input sources include a plurality of common voltage input pads connected to dummy channels at right and left sides of each of the data drive ICs.

The edge common line and the pixel common line pattern have the same metal pattern as the gate lines. The longitudinal common lines have the same metal pattern as the data lines.

The liquid crystal display further comprises a connection pattern that electrically connects the edge common line to the longitudinal common lines through a first contact hole exposing the edge common line and a second contact hole exposing the longitudinal common lines.

Each of the pixel units includes a first pixel including a first color liquid crystal cell connected to a first gate line, a second color liquid crystal cell connected to a second gate line adjacent to the first gate line, and a third color liquid crystal cell connected to the first gate line, and a second pixel including a first color liquid crystal cell connected to a third gate line adjacent to the second gate line, a second color liquid crystal cell connected to the second gate line, and a third color liquid crystal cell connected to the third gate line. A first data line is connected to the first color liquid crystal cell of the first pixel and the first and second color liquid crystal cells of the second pixel, and a second data line adjacent to the first data line is connected to the second and third color liquid crystal cells of the first pixel and the third color liquid crystal cell of the second pixel.

A pixel electrode and a common electrode of each of the first to third color liquid crystal cells of each of the first and second pixels are formed on the same substrate or are respectively formed on different substrates.

The pixel units include first and second pixel units that are vertically adjacent to each other. The first pixel unit includes a first pixel including a first color liquid crystal cell connected to a first gate line, a second color liquid crystal cell connected to the first gate line, and a third color liquid crystal cell connected to a second gate line adjacent to the first gate line, and a second pixel including a first color liquid crystal cell connected to the second gate line, a second color liquid crystal cell connected to a third gate line adjacent to the second gate line, and a third color liquid crystal cell connected to the third gate line. The second pixel unit includes a third pixel including a second color liquid crystal cell connected to a fourth gate line adjacent to the third gate line, a third color liquid crystal cell connected to the fourth gate line, and a first color liquid crystal cell connected to a fifth gate line adjacent to the fourth gate line, and a fourth pixel including a first color liquid crystal cell connected to a sixth gate line adjacent to the fifth gate line, a second color liquid crystal cell connected to the sixth gate line, and a third color liquid crystal cell connected to the fifth gate line. A first data line is connected to the first color liquid crystal cell of the first pixel, the first and second color liquid crystal cells of the second pixel, the first and second color liquid crystal cells of the third pixel, and the first color liquid crystal cell of the fourth pixel. A second data line adjacent to the first data line is connected to the second and third color liquid crystal cells of the first pixel, the third color liquid crystal cell of the second pixel, the third color liquid crystal cell of the third pixel, and the second and third color liquid crystal cells of the fourth pixel.

A pixel electrode and a common electrode of each of the first to third liquid crystals cells of each of the first to fourth pixels are formed on the same substrate or are respectively formed on different substrates.

Scan pulses each having a width of 2/3 horizontal period are sequentially generated and are supplied to the gate lines. The data drive IC inverts polarities of data voltages supplied to the data lines in synchronization with the generation of the scan pulses.

Scan pulses each having a width of 2/3 horizontal period are sequentially generated and are supplied to odd-numbered gate lines of the gate lines during a first half frame period, and scan pulses each having a width of 2/3 horizontal period are sequentially generated and are supplied to even-numbered gate lines of the gate lines during a second half frame period. The data drive IC inverts polarities of data voltages supplied to the data lines in synchronization with the generation of a first scan pulse of the scan pulses supplied to the odd-numbered gate lines and the generation of a first scan pulse of the scan pulses supplied to the even-numbered gate lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 1:
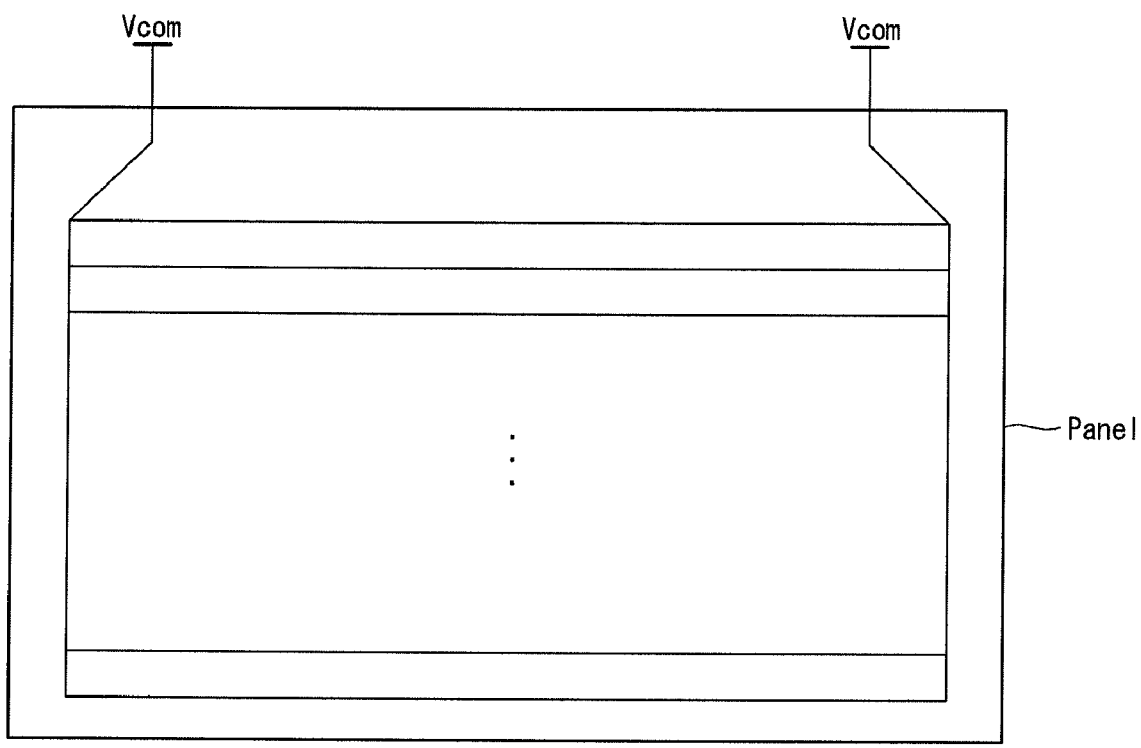
FIG. 1 illustrates a connection structure of a related art common line.
Figure 2A:
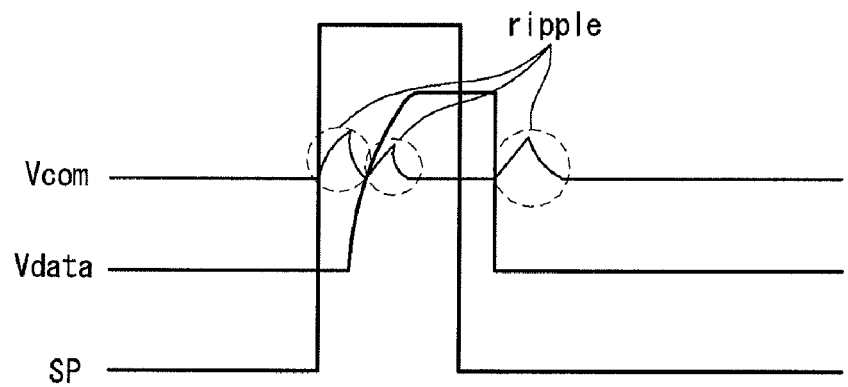
FIG. 2A illustrates a ripple phenomenon resulting from a resistance of a related art common line.
Figure 2B:
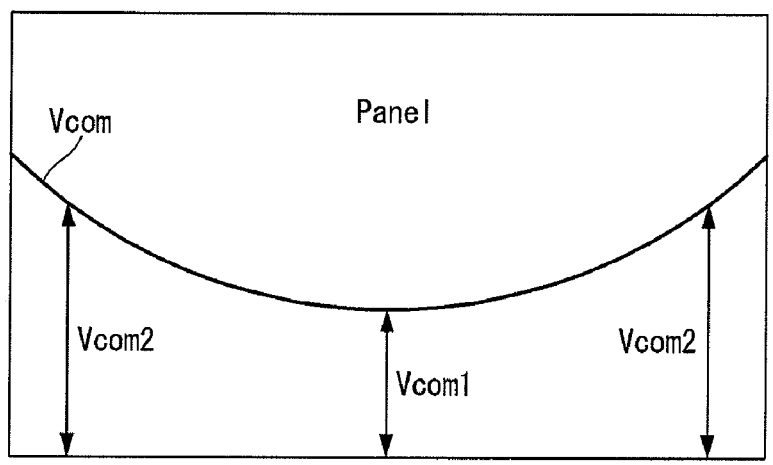
FIG. 2B illustrates a deviation of a common voltage over the entire surface of a related art liquid crystal display panel.
Figure 3A:
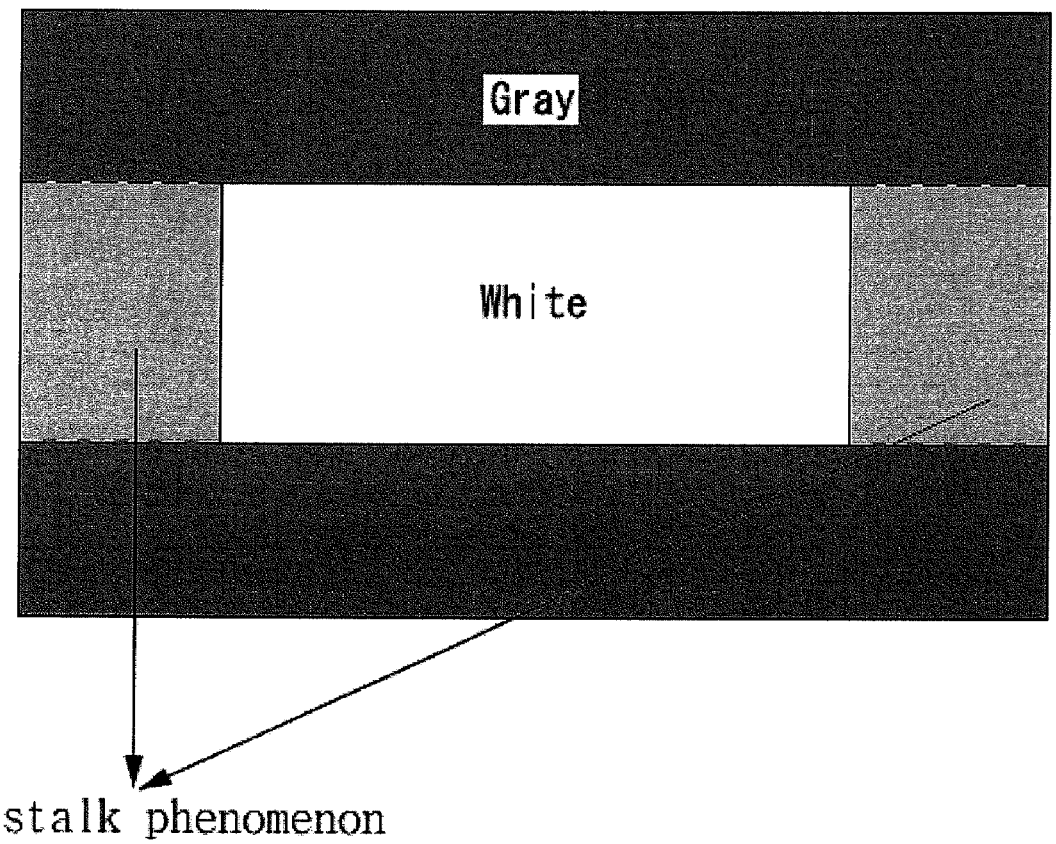
FIG. 3A illustrates a crosstalk phenomenon resulting from an instability of a common voltage in a related art liquid crystal display.
Figure 3B:
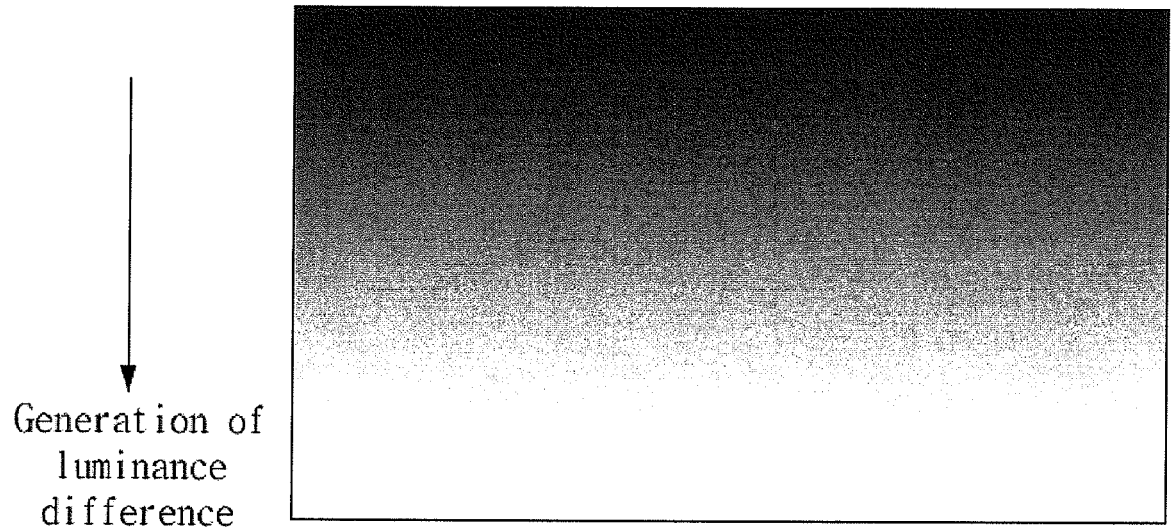
FIG. 3B illustrates a luminance difference resulting from an instability of a common voltage in a related art liquid crystal display.
Figure 4:
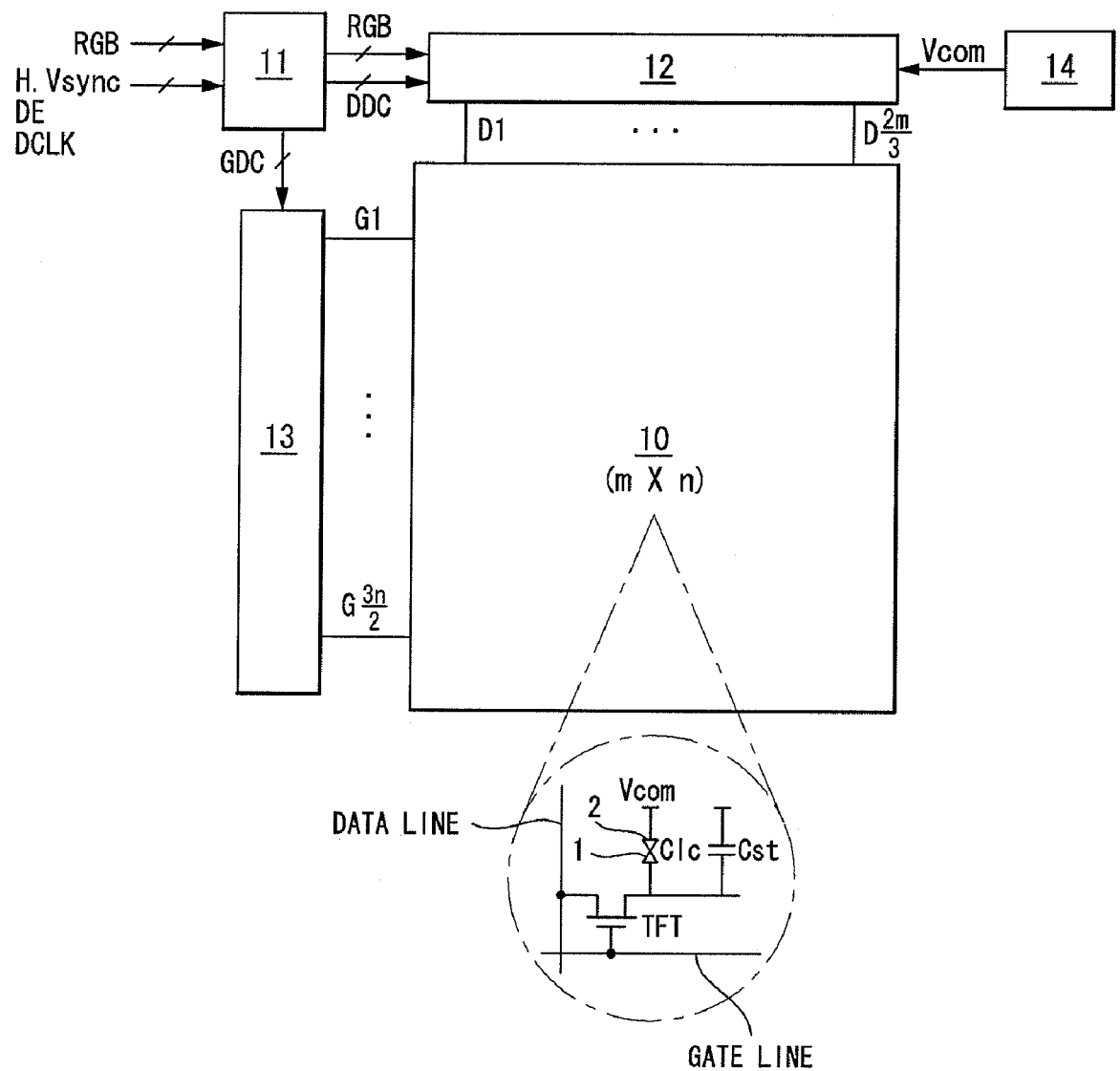
FIG. 4 is a block diagram showing an exemplary configuration of a liquid crystal display according to an embodiment of the invention.

FIG. 4 is a block diagram showing an exemplary configuration of a liquid crystal display according to an embodiment of the invention.

As shown in FIG. 4, a liquid crystal display according to an embodiment of the invention includes a liquid crystal display panel 10, a timing controller 11, a data drive circuit 12, a gate drive circuit 13, and a common voltage generation unit 14.

The liquid crystal display panel 10 includes an upper glass substrate, a lower glass substrate, and a liquid crystal layer between the upper and lower glass substrates. The liquid crystal display panel 10 includes m×n liquid crystal cells Clc (i.e., m×n subpixels) (m and n are positive integer) arranged in a matrix format at each crossing of 2m/3 data lines D1 to D(2m/3) and 3n/2 gate lines G1 to G(3n/2). In the liquid crystal display panel 10, three gate lines and two data lines are assigned to two vertically adjacent pixels so as to drive the two vertically adjacent pixels each including R, G, and B liquid crystal cells. The R, G, and B liquid crystal cells of each of the two vertically adjacent pixels are adjacently positioned in a horizontal direction. In other words, in the embodiments of the invention, the number of data lines is reduced to 2/3 of the number of data lines in the related art and the number of gate lines increases to 3/2 of the number of gate lines in the related art as compared with the related art in which m data lines and n gate lines are required to drive m×n liquid crystal cells. Hence, the liquid crystal display panel 10 according to the embodiments of the invention is driven at 1.5-speed.

The data lines D1 to D(2m/3), the gate lines G1 to G(3n/2), thin film transistors (TFTs), the liquid crystal cells Clc that are connected to the TFTs and are driven by an electric field between pixel electrodes 1 and common electrodes 2, a storage capacitor Cst, and the like are formed on the lower glass substrate of the liquid crystal display panel 10. A common line includes an edge common line formed along edges (i.e., a non-display area) of the lower glass substrate, longitudinal common lines that are formed in a direction parallel to the data lines D1 to D(2m/3) and are connected to the edge common line, and pixel common line patterns that are formed along edges of each liquid crystal cell to have a mesh structure and are connected to the longitudinal common lines. The common line is electrically connected to an output terminal of the common voltage generation unit 14, and the common electrodes 2 are electrically connected to the common line. The common line may be connected to the common electrode 2 and may form a storage capacitor Cst of a storage-on-common manner in a pixel array. In this case, the common line may overlap the pixel electrodes 1 on the lower glass substrate with an insulating layer interposed between the common line and the pixel electrodes 1.

A black matrix, a color filter, and the common electrodes 2 are formed on the upper glass substrate of the liquid crystal display panel 10.

The common electrode 2 is formed on the upper glass substrate in a vertical electric drive manner, such as a twisted nematic (TN) mode and a vertical alignment (VA) mode. The common electrode 2 and the pixel electrode 1 are formed on the lower glass substrate in a horizontal electric drive manner, such as an in-plane switching (IPS) mode and a fringe field switching (FFS) mode.

Polarizing plates each having optical axes that cross at a right angle are attached respectively to the upper and lower glass substrates. Alignment layers for setting a pre-tilt angle of the liquid crystal in an interface contacting the liquid crystal are respectively formed on the upper and lower glass substrates.

The timing controller 11 receives timing signals, such as horizontal and vertical sync signals Hsync and Vsync, a data enable signal DE, a dot clock signal DCLK to generate a data timing control signal DDC for controlling operation timing of the data drive circuit 12 and a gate timing control signal GDC for controlling operation timing of the gate drive circuit 13. The gate timing control signal GDC includes a gate start pulse GSP, a gate shift clock signal GSC, a gate output enable signal GOE, and the like. The gate start pulse GSP indicates a scan start line of a scan operation. The gate shift clock signal GSC controls an output of the gate drive circuit 13 so that the gate drive circuit 13 sequentially shifts the gate start pulse GSP. The gate output enable signal GOE controls an output of the gate drive circuit 13. The data timing control signal DDC includes a source start pulse SSP, a source sampling clock signal SSC, a source output enable signal SOE, a polarity control signal POL, and the like. The source start pulse SSP indicates a start liquid crystal cell in 1 horizontal line to which data will be displayed. The source sampling clock signal SSC indicates a latch operation of data inside the data drive circuit 12 based on a rising or falling edge. The polarity control signal POL controls a polarity of an analog video data voltage output by the data drive circuit 12. The source output enable signal SOE controls an output of a source drive integrated circuit (IC).

The data drive circuit 12 includes a plurality of data drive ICs. Each of the data drive ICs latches digital video data RGB under the control of the timing controller 11, and then converts the digital video data RGB into an analog positive or negative data voltage to supply the analog positive/negative data voltage to the data lines D1 to D2m/3. Each data drive IC supplies a common voltage Vcom generated by the common voltage generation unit 14 to the common line using left and right dummy channels of each data drive IC. Because the number of data lines is reduced to 2/3 of the number of data lines in the related art, the number of data drive ICs decreases. For example, if a horizontal resolution is 1920, 6 data drive ICs each having 960 channels are needed in the related art. However, in the embodiment of the invention, only 4 data drive ICs each having 960 channels are needed so as to achieve the horizontal resolution of 1920. Hence, in the embodiment of the invention, the manufacturing cost can be greatly reduced. Problems such as heat generation inside the data drive ICs resulting from a reduction in the number of data lines and a defect in longitudinal lines resulting from a reduction in charge time may be negligible in 1.5-speed drive according to the embodiment of the invention.

The gate drive circuit 13 includes a plurality of gate drive ICs. The gate drive ICs supply scan pulses to the gate lines G1 to G(3n/2) under the control of the timing controller 11.

The common voltage generation unit 14 generates the common voltage Vcom. The common voltage Vcom is applied to the common line via each data drive IC.

Figure 5:
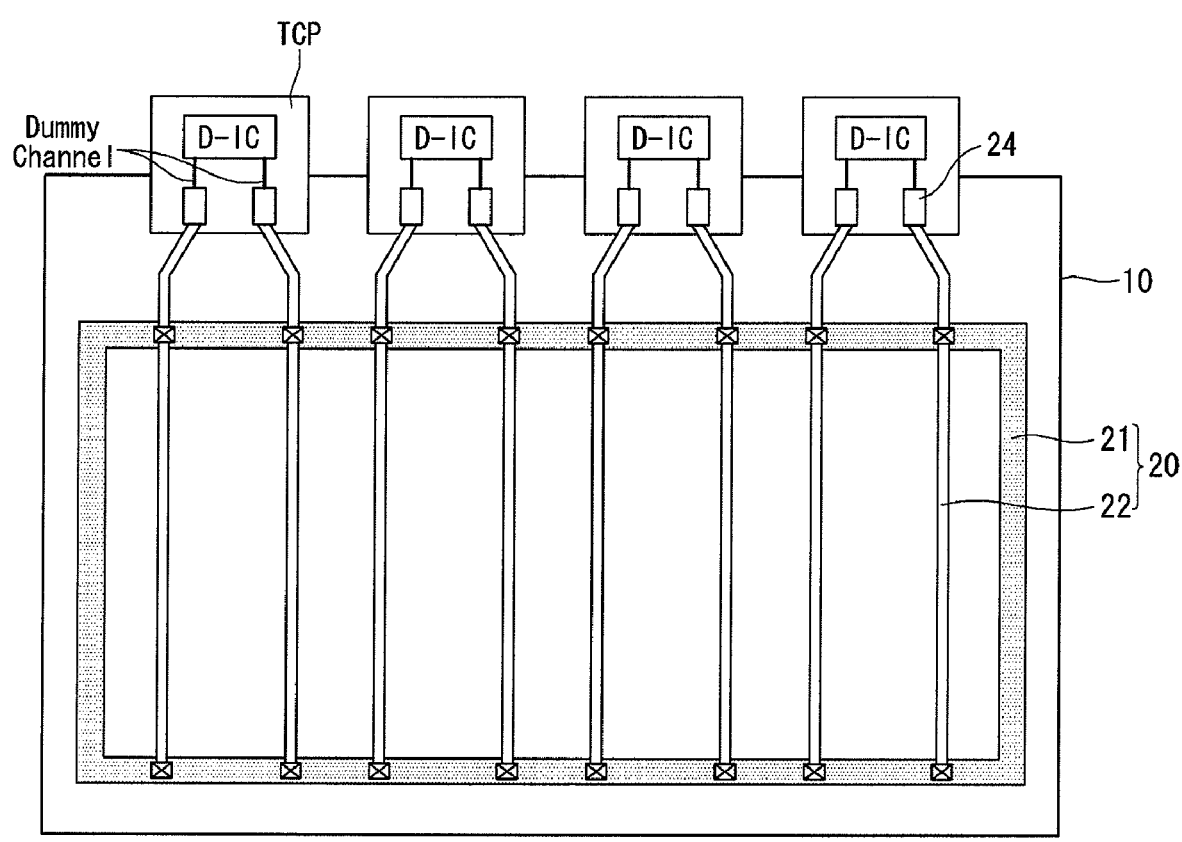
FIG. 5 is a plane view of a common line according to an exemplary embodiment of the invention.
Figure 6:
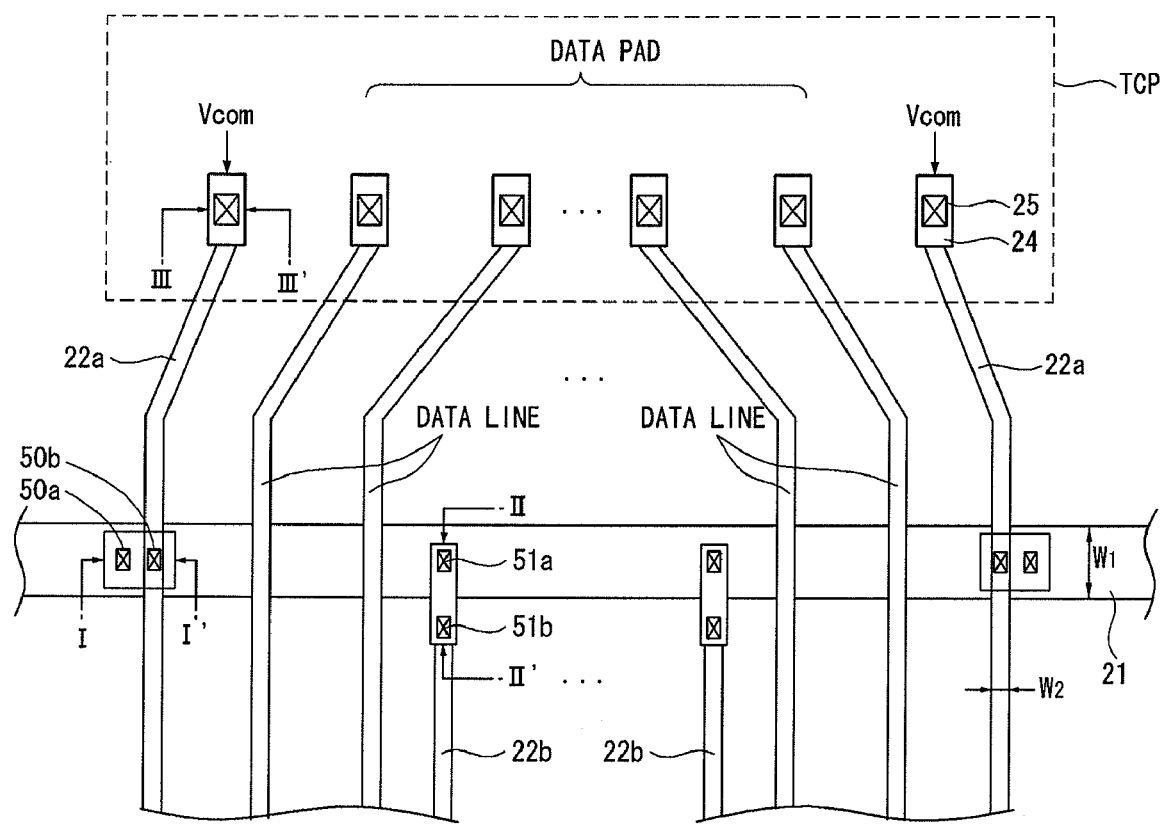
FIG. 6 is a plane view showing a common line and data lines.
Figure 7:
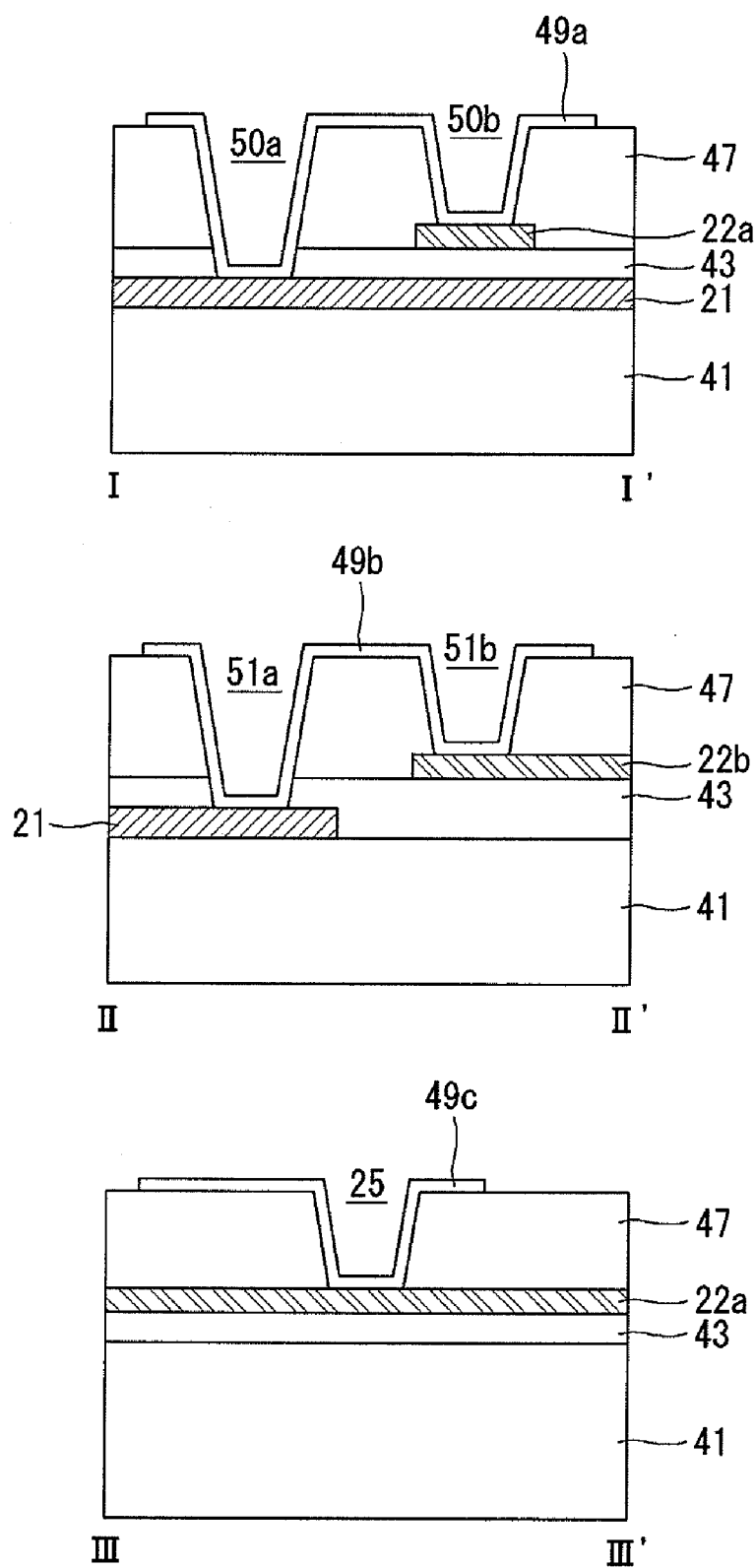
FIG. 7 is a cross-sectional view of a common line taken along lines I-I', II-II' and III-III' shown in FIG. 6.

FIG. 5 is a plane view of the common line according to the embodiment of the invention. FIG. 6 is a plane view showing a portion of the common line and a portion of the data lines. FIG. 7 is a cross-sectional view of a common line taken along lines I-I', II-II' and III-III' shown in FIG. 6. In FIG. 7, a reference numeral 41 denotes a lower glass substrate, 43 a gate insulting layer, and 47 a protective layer.

As shown in FIGS. 5 to 7, a common line 20 includes an edge common line 21 having a relatively wide width at an edge of a substrate, a plurality of longitudinal common lines 22 extending in a longitudinal direction, and a plurality of pixel common line patterns that are formed to have a mesh structure in each liquid crystal cell and are connected to one another. The pixel common line patterns will be described later with reference to FIGS. 8 to 12.

The longitudinal common lines 22 include a plurality of first longitudinal common lines 22a and a plurality of second longitudinal common lines 22b. The longitudinal common lines 22a and 22b are formed in a direction parallel to the data lines. The longitudinal common lines 22a and 22b are alternately formed between horizontally adjacent first and second pixels each including R, G, and B liquid crystal cells, so as to increase an aperture ratio in a pixel array.

Each of the first longitudinal common lines 22a is connected to a Vcom pad 24. Each of the first longitudinal common lines 22a is electrically connected to the edge common line 21 through first and second common line contact holes 50a and 50b. In the first common line contact hole 50a, a portion of the edge common line 21 not overlapping the first longitudinal common line 22a is connected to a first connection pattern 49a. In the second common line contact hole 50b, a portion of the first longitudinal common line 22a overlapping the edge common line 21 is connected to the first connection pattern 49a. The first connection pattern 49a may be formed of a transparent electrode material.

Each of the second longitudinal common lines 22b is electrically connected to the edge common line 21 through third and fourth common line contact holes 51a and 51b. In the third common line contact hole 51a, a portion of the edge common line 21 not overlapping the second longitudinal common line 22b is connected to a second connection pattern 49b. In the fourth common line contact hole 51b, a portion of the second longitudinal common line 22b not overlapping the edge common line 21 is connected to the second connection pattern 49b. The second connection pattern 49b may be formed of a transparent electrode material.

The Vcom pad 24 is connected to the first longitudinal common line 22a through a Vcom contact hole 25. In the Vcom contact hole 25, the first longitudinal common line 22a is connected to a third connection pattern 49c. The third connection pattern 49c may be formed of a transparent electrode material.

The two Vcom pads 24 are assigned to each data drive IC D-IC so that the two Vcom pads 24 are respectively connected to two dummy channels disposed at both sides of each data drive IC D-IC. The Vcom pad 24 transfers the common voltage Vcom supplied via the data drive IC D-IC to the common line 20. The Vcom pad 24 may be connected to an output terminal of the common voltage generation unit 14 to transfer the common voltage Vcom from the common voltage generation unit 14 to the common line 20 without passing through the data drive IC D-IC. Because the number of Vcom pads 24 in the exemplary embodiment greatly increases as compared with two input sources for supplying the common voltage in the related art, a deviation of the common voltage over the entire surface of the liquid crystal display panel 10 can be greatly reduced. Further, a resistance of the common line 20 can be greatly reduced.

A width W1 of the edge common line 21 is greater than a width W2 of the longitudinal common line 22 so as to reduce the resistance of the common line 20. It is preferable that the width W2 of each longitudinal common line 22 is smaller than a width of each data line so as to prevent a reduction in an aperture ratio in the pixel array.

As described above, because the liquid crystal display according to the embodiment of the invention includes the common line 20 including the edge common line 21 of the relatively wide width and the longitudinal common lines 22 that are connected to the edge common line 21 and extend in a direction parallel to the data lines, a load of the common line 20 can be distributed, and a distortion of the common line 20 can be reduced. For example, in the related art, because common lines are formed in a direction parallel to gate lines, when 1 horizontal line is scanned by a scan pulse, one common line is affected by a data voltage applied to all of liquid crystal cells on the 1 horizontal line. However, in the embodiment of the invention, when 1 horizontal line is scanned by a scan pulse, only a data voltage applied to 3 liquid crystal cells affects the longitudinal common lines 22. Therefore, the load of the common line 20 is greatly distributed.

Further, in the liquid crystal display according to the embodiment of the invention, because the number of input sources used to apply the common voltage Vcom to the common line 20 increases, a deviation of the common voltage Vcom over the entire surface of the liquid crystal display panel 10 can be greatly reduced. Further, a resistance of the common line 20 can be greatly reduced.

Each longitudinal common line 22 is formed between not the liquid crystal cells but the pixels, and the common voltage Vcom applied to the longitudinal common lines 22 is applied to the pixel common line patterns having the mesh structure in each liquid crystal cell in consideration of a reduction in the aperture ratio. The common voltage Vcom may be commonly used in the pixel due to the pixel common line patterns.

Figure 8:
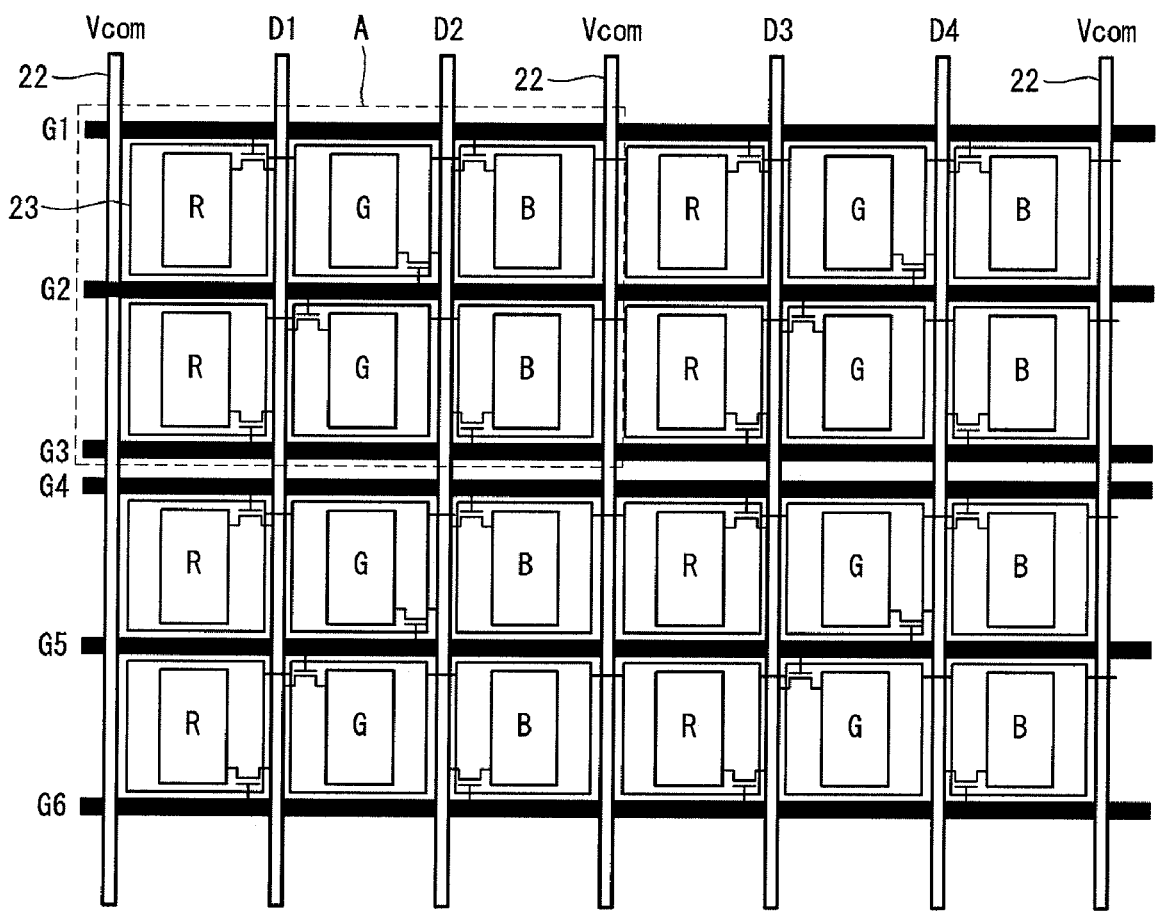
FIG. 8 schematically shows a liquid crystal display panel on which longitudinal common lines and pixel common line patterns are formed.

FIG. 8 schematically shows the liquid crystal display panel 10 on which the longitudinal common lines 22 and pixel common line patterns 23 are formed.

As shown in FIG. 8, the liquid crystal display according to the embodiment of the invention drives two vertically adjacent pixels each including horizontally adjacent R, G, and B liquid crystal cells using two data lines and three gate lines, so as to reduce the number of data lines.

More specifically, each of pixels of odd-numbered horizontal lines uses a second first data line of two data lines assigned to each pixel as a common data line, and each of pixels of even-numbered horizontal lines uses a first data line of two data lines assigned to each pixel as a common data line. For example, G and B liquid crystal cells of a predetermined pixel on a first horizontal line share a second data line D2, and R and G liquid crystal cells of a pixel vertically adjacent to the predetermined pixel on a second horizontal line share a first data line D1. TFTs respectively connected to R, G, and B liquid crystal cells of any pixel may be connected between two gate lines in zigzags. Hence, in the predetermined pixel on the first horizontal line, an R liquid crystal cell is connected to a first gate line G1, the G liquid crystal cell is connected to a second gate line G2, and the B liquid crystal cell is connected to the first gate line G1. Further, in the predetermined pixel on the first horizontal line, the R liquid crystal cell is charged to a first data voltage from the first data line D1 in response to a scan pulse from the first gate line G1, the B liquid crystal cell is charged to a second data voltage from the second data line D2 in response to a scan pulse from the first gate line G1, and the G liquid crystal cell is charged to a third data voltage from the second data line D2 in response to a scan pulse from the second gate line G2. In the pixel vertically adjacent to the predetermined pixel on the second horizontal line, the R liquid crystal cell is connected to a third gate line G3, the G liquid crystal cell is connected to the second gate line G2, and a B liquid crystal cell is connected to the third gate line G3. Further, in the pixel vertically adjacent to the predetermined pixel on the second horizontal line, the G liquid crystal cell is charged to a fourth data voltage from the first data line D1 in response to a scan pulse from the second gate line G2, the R liquid crystal cell is charged to a fifth data voltage from the first data line D1 in response to a scan pulse from the third gate line G3, and the B liquid crystal cell is charged to a sixth data voltage from the second data line D2 in response to a scan pulse from the third gate line G3.

Each of the longitudinal common lines 22 has the same metal pattern as the date line and is positioned every two data lines. Each of the pixel common line patterns 23 has the same metal pattern as the gate line and is formed along edges of each liquid crystal cell. Hence, the pixel common line pattern 23 has a mesh structure in each liquid crystal cell. The pixel common line pattern 23 supplies the common voltage Vcom from the longitudinal common line 22 to the common electrode of each liquid crystal cell. For this, the pixel common line pattern 23 is connected to the common electrode and the longitudinal common lines 22 through a contact hole.

Figure 9:
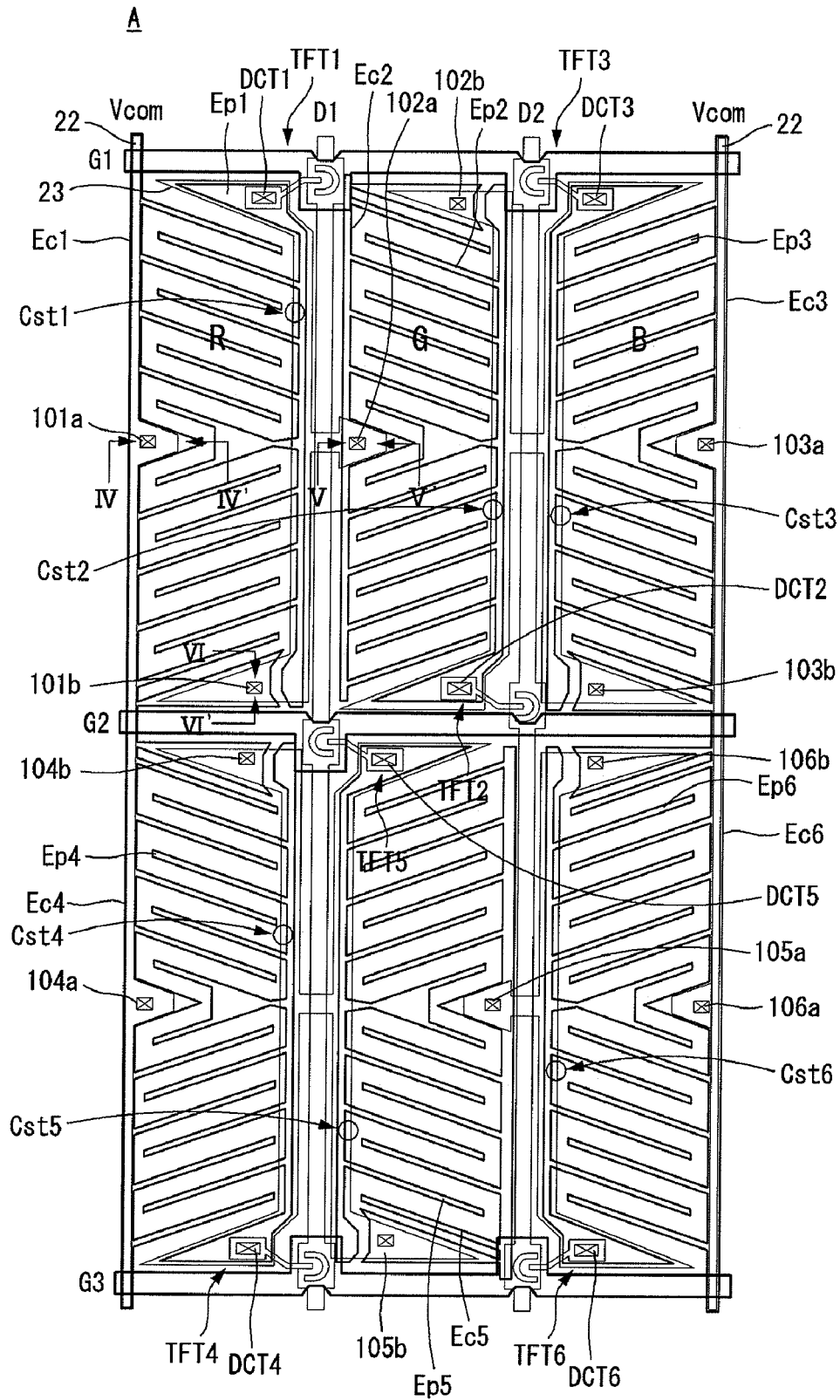
FIG. 9 is a plane view illustrating an exemplary operation of "A" portion (pixel unit) including two vertically adjacent pixels shown in FIG. 8 in a horizontal in-plane switching (IPS) mode.
Figure 10:
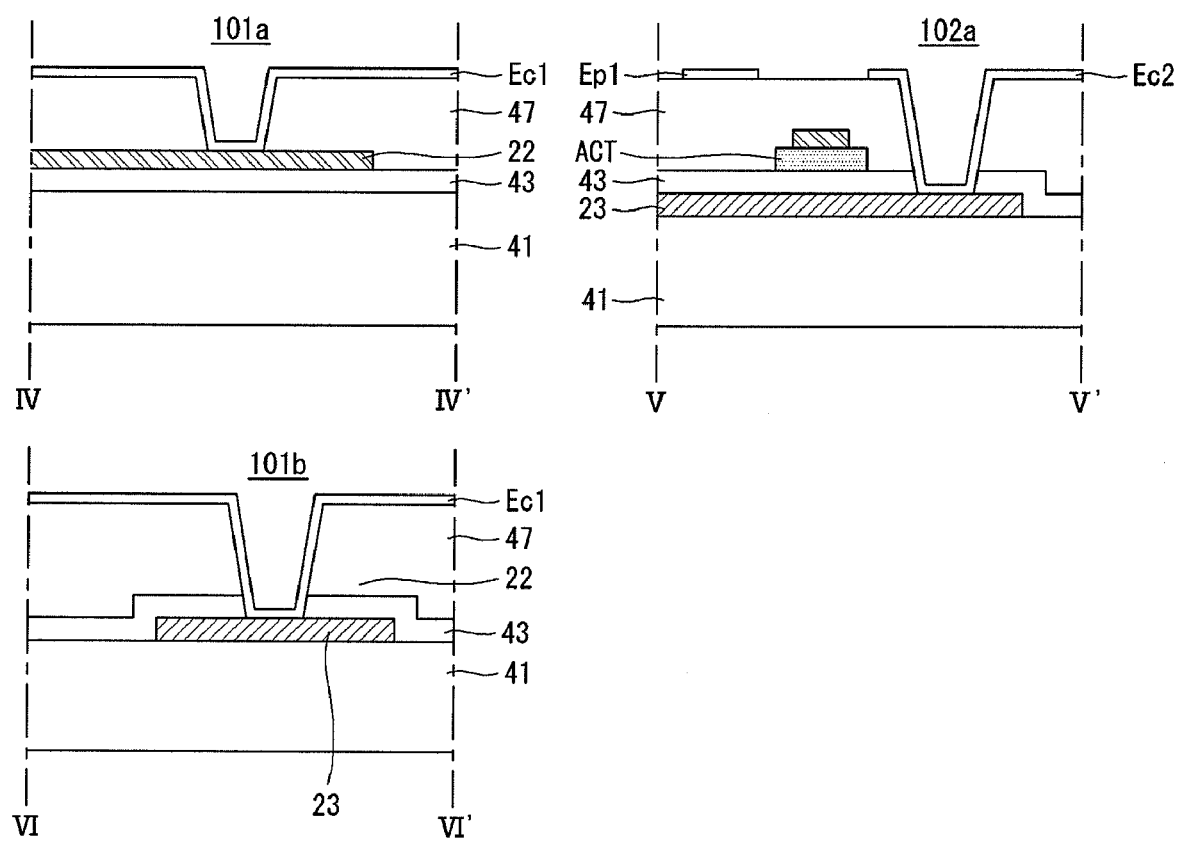
FIG. 10 illustrates a connection structure among a longitudinal common line, a pixel common line pattern, and a common electrode in each liquid crystal cell taken along lines IV-IV', V-V' and VI-VI' of FIG. 9.

FIG. 9 illustrates an exemplary operation of "A" portion (pixel unit) including the two vertically adjacent pixels shown in FIG. 8 in a horizontal in-plane switching (IPS) mode. FIG. 10 illustrates a connection structure among the longitudinal common line 22, the pixel common line pattern 23, and the common electrode in each liquid crystal cell taken along lines IV-IV', V-V' and VI-VI' of FIG. 9. In FIG. 10, a reference numeral 41 denotes a lower glass substrate, 43 a gate insulating layer, and 47 a protective layer.

As shown in FIGS. 9 and 10, each of R, G, and B liquid crystal cells constituting each of first and second pixels includes the pixel common line pattern 23 having the mesh structure and is driven by a voltage difference between the common electrode and the pixel electrode that are opposite to each other in a horizontal direction.

In the R liquid crystal cell of the first pixel, a common electrode Ec1 of the R liquid crystal cell includes a plurality of first fingers inclining to the data lines and a first connection portion that partially overlaps the longitudinal common line 22 and the pixel common line pattern 23 to connect the first fingers to each other. A pixel electrode Ep1 of the R liquid crystal cell includes a plurality of second fingers, that incline to the data lines and are opposite to the first fingers on the same plane as the first fingers, and a second connection portion that partially overlaps the pixel common line pattern 23 to connect the second fingers to each other. The common electrode Ec1 is connected to the longitudinal common line 22 through a first common electrode contact hole 101a and is connected to the pixel common line pattern 23 through a second common electrode contact hole 101b. The pixel electrode Ep1 is connected to a first TFT TFT1 through a first drain contact hole DCT1. The first TFT TFT1 supplies the first data voltage from the first data line D1 to the pixel electrode Ep1 in response to a scan pulse from the first gate line G1. A first storage capacitor Cst1 is formed in an overlap area of the second connection portion and the pixel common line pattern 23 to keep a voltage during one frame at the first data voltage.

In the G liquid crystal cell of the first pixel, a common electrode Ec2 of the G liquid crystal cell includes a plurality of third fingers inclining to the data lines and a third connection portion that partially overlaps the pixel common line pattern 23 to connect the third fingers to each other. A pixel electrode Ep2 of the G liquid crystal cell includes a plurality of fourth fingers, that incline to the data lines and are opposite to the third fingers on the same plane as the third fingers, and a fourth connection portion that partially overlaps the pixel common line pattern 23 to connect the fourth fingers to each other. The common electrode Ec2 is connected to the pixel common line pattern 23 through a third common electrode contact hole 102a and is connected to the pixel common line pattern 23 through a fourth common electrode contact hole 102b. The pixel electrode Ep2 is connected to a second TFT TFT2 through a second drain contact hole DCT2. The second TFT TFT2 supplies the third data voltage from the second data line D2 to the pixel electrode Ep2 in response to a scan pulse from the second gate line G2. A second storage capacitor Cst2 is formed in an overlap area of the fourth connection portion and the pixel common line pattern 23 to keep a voltage during one frame at the third data voltage.

In the B liquid crystal cell of the first pixel, a common electrode Ec3 of the B liquid crystal cell includes a plurality of fifth fingers inclining to the data lines and a fifth connection portion that partially overlaps the longitudinal common line 22 and the pixel common line pattern 23 to connect the fifth fingers to each other. A pixel electrode Ep3 of the B liquid crystal cell includes a plurality of sixth fingers, that incline to the data lines and are opposite to the fifth fingers on the same plane as the fifth fingers, and a sixth connection portion that partially overlaps the pixel common line pattern 23 to connect the sixth fingers to each other. The common electrode Ec3 is connected to the longitudinal common line 22 through a fifth common electrode contact hole 103a and is connected to the pixel common line pattern 23 through a sixth common electrode contact hole 103b. The pixel electrode Ep3 is connected to a third TFT TFT3 through a third drain contact hole DCT3. The third TFT TFT3 supplies the second data voltage from the second data line D2 to the pixel electrode Ep3 in response to a scan pulse from the first gate line G1. A third storage capacitor Cst3 is formed in an overlap area of the sixth connection portion and the pixel common line pattern 23 to keep a voltage during one frame at the second data voltage.

A connection structure among the longitudinal common line 22, the pixel common line pattern 23, and the common electrode in the R, G, and B liquid crystal cells of the second pixel is substantially the same as the connection structure in the R, G, and B liquid crystal cells of the first pixel, except connection locations between the gate lines and the TFTs. Therefore, a further description may be briefly made or may be entirely omitted.

Figure 11:
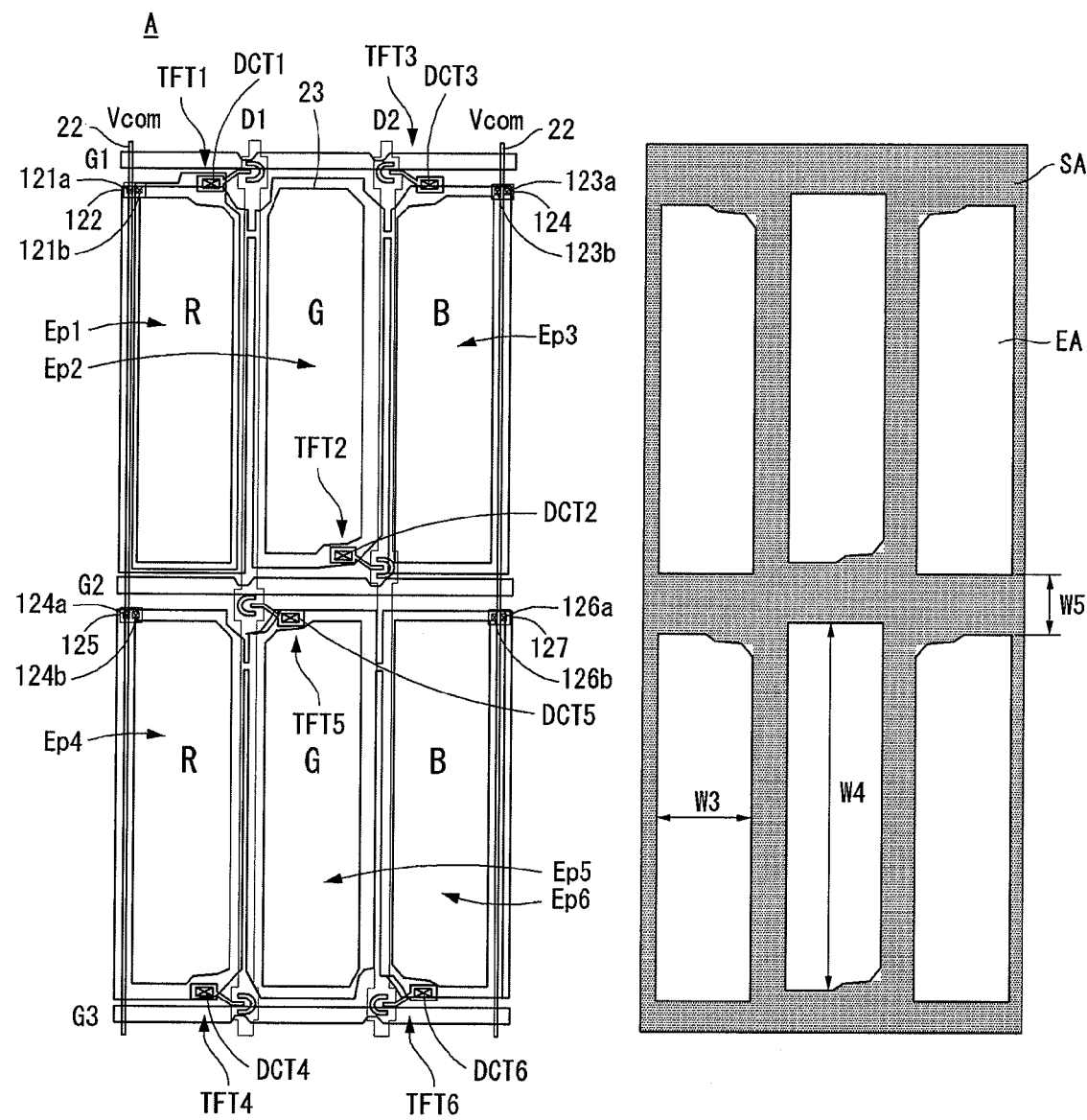
FIG. 11 is a plane view illustrating an exemplary operation of "A" portion (pixel unit) including two vertically adjacent pixels shown in FIG. 8 in a twisted nematic (TN) mode.
Figure 12:
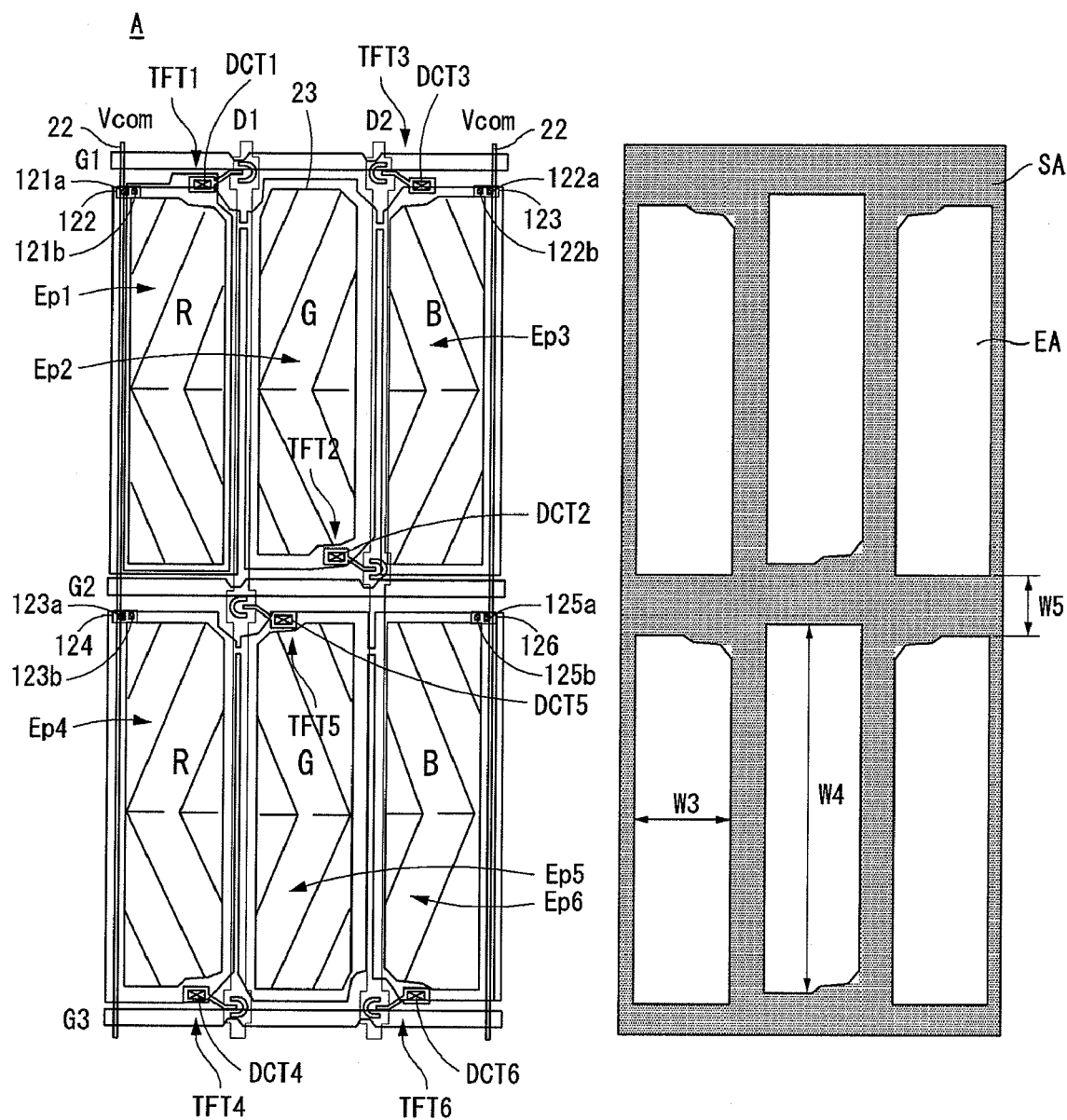
FIG. 12 is a plane view illustrating an exemplary operation of "A" portion (pixel unit) including two vertically adjacent pixels shown in FIG. 8 in a vertical alignment (VA) mode.
Figure 13:
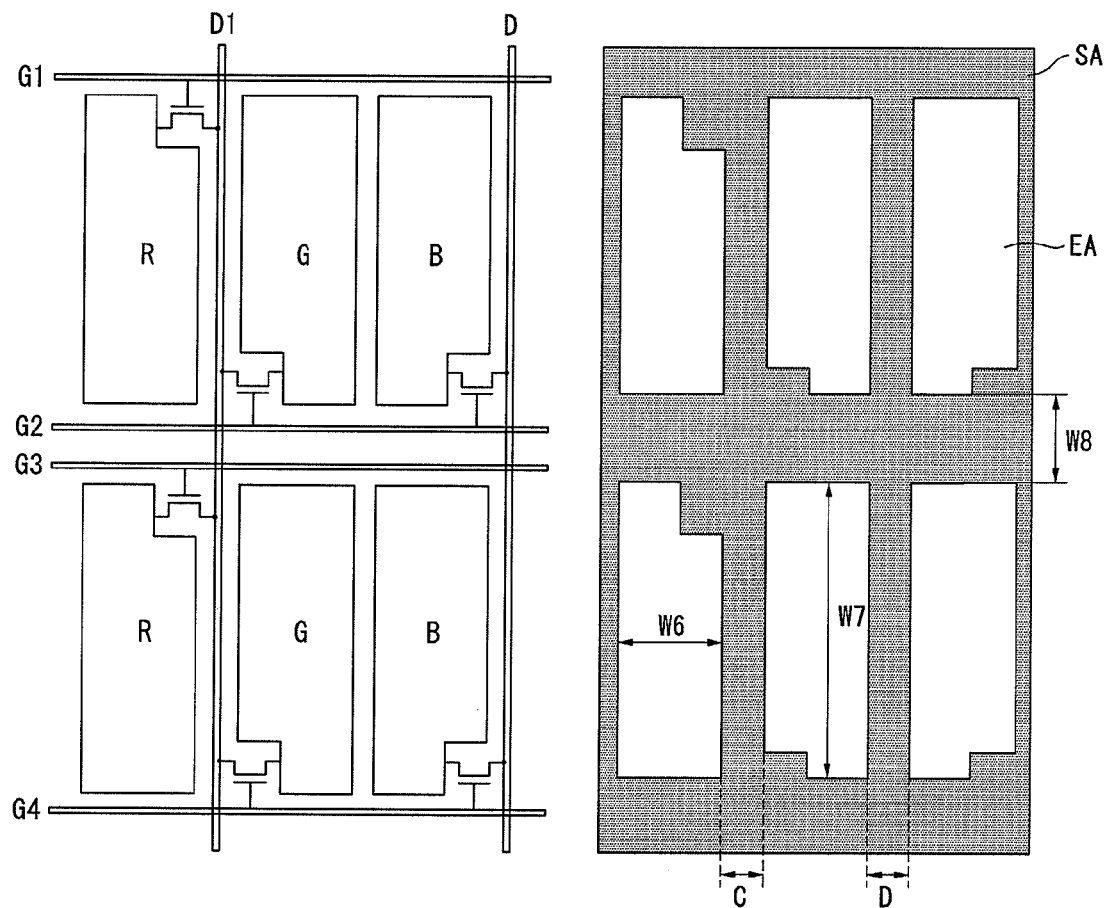
FIG. 13 illustrates a general 2-speed drive of pixels operating in a TN mode.

FIG. 11 is a plane view illustrating an exemplary operation of the "A" portion including the two vertically adjacent pixels shown in FIG. 8 in a twisted nematic (TN) mode. FIG. 12 is a plane view illustrating an exemplary operation of the "A" portion including the two vertically adjacent pixels shown in FIG. 8 in a vertical alignment (VA) mode. FIG. 13 illustrates a general 2-speed drive of pixels operating in a TN mode. In FIGS. 11 to 13, SA denotes a non-opening area, and EA denotes an opening area.

As shown in FIG. 11, each liquid crystal cell includes the pixel common line pattern 23 having the mesh structure and is driven by a voltage difference between the common electrode and the pixel electrode that are opposite to each other in a vertical direction. For this, the common electrode (not shown) is formed on the entire surface of the upper glass substrate (not shown) so that the common electrode (not shown) is opposite to the pixel electrode of each liquid crystal cell, and receives the common voltage Vcom.

In the R liquid crystal cell of the first pixel, a pixel electrode Ep1 of the R liquid crystal cell partially overlaps the pixel common line pattern 23 at an edge of the pixel electrode Ep1 and is formed on the entire opening area. The pixel electrode Ep1 is connected to a first TFT TFT1 through a first drain contact hole DCT1. The first TFT TFT1 supplies the first data voltage from the first data line D1 to the pixel electrode Ep1 in response to a scan pulse from the first gate line G1. A first storage capacitor Cst1 is formed in an overlap area of the pixel electrode Ep1 and the pixel common line pattern 23 to keep a voltage during one frame at the first data voltage. A first transparent electrode pattern 122 is formed in the R liquid crystal cell so that the common voltage Vcom from the longitudinal common line 22 is supplied the pixel common line pattern 23. The first transparent electrode pattern 122 electrically connects the longitudinal common line 22 exposed through a first common line contact hole 121a to the pixel common line pattern 23 exposed through a second common line contact hole 121b.

In the G liquid crystal cell of the first pixel, a pixel electrode Ep2 of the G liquid crystal cell partially overlaps the pixel common line pattern 23 at an edge of the pixel electrode Ep2 and is formed on the entire opening area. The pixel electrode Ep2 is connected to a second TFT TFT2 through a second drain contact hole DCT2. The second TFT TFT2 supplies the third data voltage from the second data line D2 to the pixel electrode Ep2 in response to a scan pulse from the second gate line G2. A second storage capacitor Cst2 is formed in an overlap area of the pixel electrode Ep2 and the pixel common line pattern 23 to keep a voltage during one frame at the third data voltage. The pixel common line pattern 23 inside the G liquid crystal cell is electrically connected to the pixel common line pattern 23 inside the R liquid crystal cell and the pixel common line pattern 23 inside the B liquid crystal cell.

In the B liquid crystal cell of the first pixel, a pixel electrode Ep3 of the B liquid crystal cell partially overlaps the pixel common line pattern 23 at an edge of the pixel electrode Ep3 and is formed on the entire opening area. The pixel electrode Ep3 is connected to a third TFT TFT3 through a third drain contact hole DCT3. The third TFT TFT3 supplies the second data voltage from the second data line D2 to the pixel electrode Ep3 in response to a scan pulse from the first gate line G1. A third storage capacitor Cst3 is formed in an overlap area of the pixel electrode Ep3 and the pixel common line pattern 23 to keep a voltage during one frame at the second data voltage. A second transparent electrode pattern 124 is formed in the B liquid crystal cell so that the common voltage Vcom from the longitudinal common line 22 is supplied the pixel common line pattern 23. The second transparent electrode pattern 124 electrically connects the longitudinal common line 22 exposed through a third common line contact hole 123a to the pixel common line pattern 23 exposed through a fourth common line contact hole 123b.

A connection structure between the longitudinal common line 22 and the pixel common line pattern 23 in the R, G, and B liquid crystal cells of the second pixel is substantially the same as the connection structure in the R, G, and B liquid crystal cells of the first pixel, except connection locations between the gate lines and the TFTs. Therefore, a further description may be briefly made or may be entirely omitted.

FIG. 12 illustrates pixels operating in the VA mode. A plane structure of the operation of the "A" portion in the VA mode illustrated in FIG. 12 is substantially the same as the plane structure of the operation of the "A" portion in the TN mode illustrated in FIG. 11, except that a split is formed in the pixel electrode of each liquid crystal cell of the "A" portion so as to increase a viewing angle by forming multi-domain. Therefore, a further description may be briefly made or may be entirely omitted.

An aperture ratio of a pixel array in a general 2-speed drive and an aperture ratio of a pixel array in a 1.5-speed drive according to the embodiments of the invention are compared with reference to FIGS. 12 and 13. FIGS. 11 and 12 illustrate 1.5-speed drive of pixels according to the embodiments of the invention, and FIG. 13 illustrates a general 2-speed drive of pixels. In the general 2-speed drive, as shown in FIG. 13, two data lines D1 and D2 and fourth gate lines G1 to G4 are used to drive two vertically adjacent pixels. An interval W8 between two vertically adjacent pixels in the general 2-speed drive is greater than an interval W5 between the two vertically adjacent pixels in the 1.5-speed drive. For example, in an experiment using a 22-inch panel, the interval W5 in the 1.5-speed drive was about 50.56 μm, and the interval W8 in the general 2-speed drive was about 63.2 μm. Namely, the interval W8 increased by about 20% of the interval W5. This is because the number of gate lines (i.e., 4 gate lines) assigned to the two vertically adjacent pixels in the general 2-speed drive is more than the number of gate lines (i.e., 3 gate lines) assigned to the two vertically adjacent pixels in the 1.5-speed drive. Accordingly, a length W4 of the opening area EA in the 1.5-speed drive is longer than a length W7 of the opening area EA in the general 2-speed drive. For example, in the experiment using the 22-inch panel, the length W4 was about 231 μm, and the length W7 was about 218 μm. Namely, the length W4 in the 1.5-speed drive increased by about 1.03% of the length W7 in the general 2-speed drive. Further, a width W3 of the opening area EA in the 1.5-speed drive is greater than a width W6 of the opening area EA in the general 2-speed drive. For example, in the experiment using the 22-inch panel, the width W3 of about 67.2 μm in the 1.5-speed drive increased by about 1.06% of the width W6 of about 65 μm in the general 2-speed drive. This is because a width D of the non-opening area SA where the data line is not formed has to widen in the general 2-speed drive although the number of data lines in the general 2-speed drive is less than the number of data lines in the 1.5-speed drive according to the embodiments of the invention. Hence, it is difficult to improve the aperture ratio in the general 2-speed drive. In the general 2-speed drive, if the width D of the non-opening area SA where the data line is not formed is not approximately equal to a width C of the non-opening area SA where the data line is formed, the image quality is reduced because of a deviation in a width between liquid crystal cells (i.e., a deviation in the width C or D of the non-opening area SA) in one pixel. On the other hand, in the embodiments of the invention, because a width of the longitudinal common line is much smaller than a width of the data line and the width of the non-opening area in one pixel is constant, the aperture ratio can increase.

Figure 14:
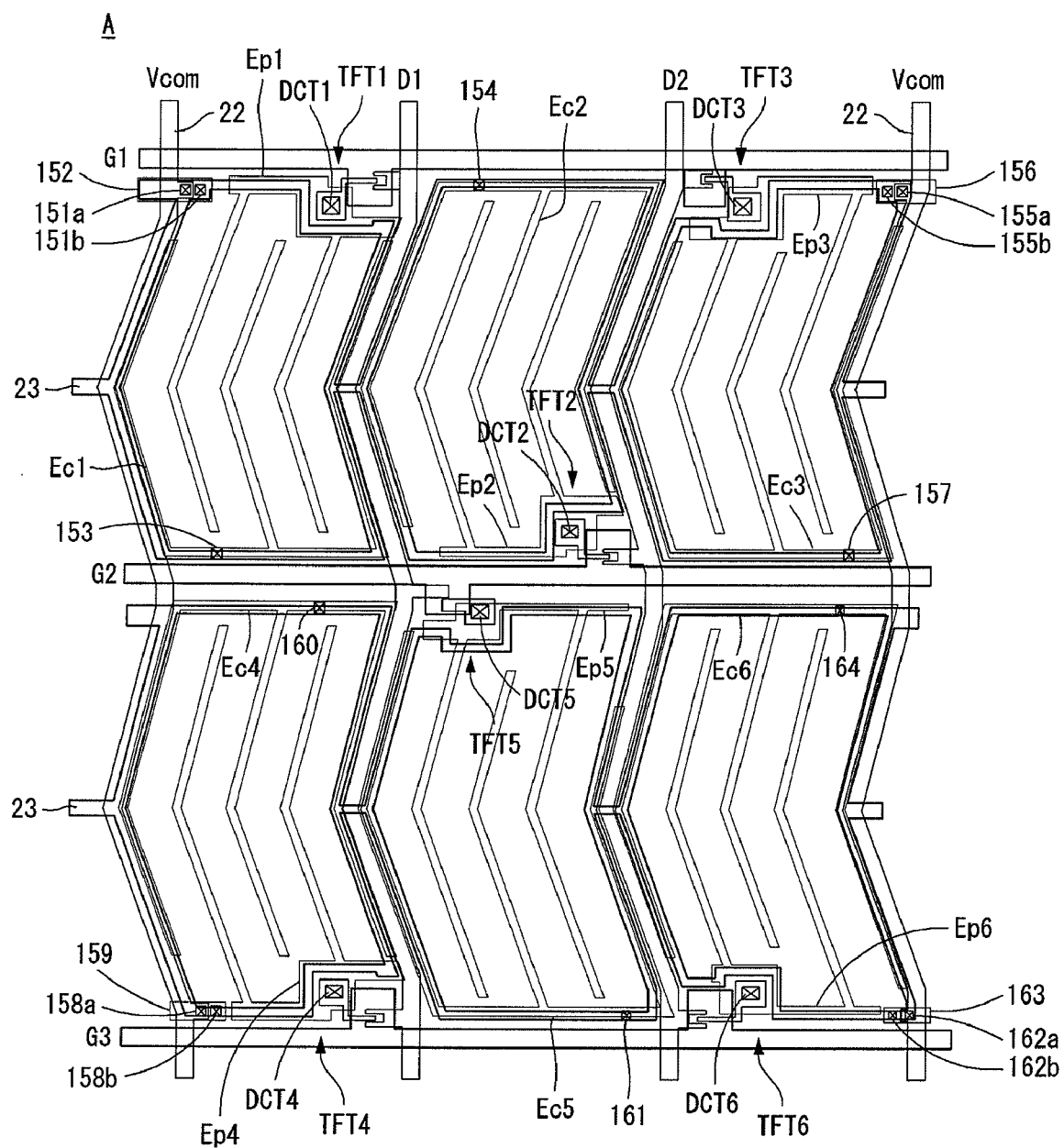
FIG. 14 is a plane view illustrating an exemplary operation of "A" portion (pixel unit) including two vertically adjacent pixels shown in FIG. 8 in a super IPS mode.

FIG. 14 is a plane view illustrating an exemplary operation of the "A" portion (pixel unit) including the two vertically adjacent pixels shown in FIG. 8 in a super IPS mode.

As shown in FIG. 14, each of R, G, and B liquid crystal cells constituting each of the first and second pixels includes the pixel common line pattern 23 having the mesh structure and is driven by a voltage difference between the common electrode and the pixel electrode that are opposite to each other in a horizontal direction.

In the R liquid crystal cell of the first pixel, a common electrode Ec1 of the R liquid crystal cell includes a plurality of first fingers, that are formed parallel to the data lines and partially overlap the pixel common line pattern 23, and a first connection portion that partially overlaps the pixel common line pattern 23 to connect the first fingers to each other. A pixel electrode Ep1 of the R liquid crystal cell includes a plurality of second fingers, that are formed parallel to the data lines and are opposite to the first fingers on the same plane as the first fingers, and a second connection portion that partially overlaps the pixel common line pattern 23 to connect the second fingers to each other. A first transparent electrode pattern 152 is formed in the R liquid crystal cell so that the common voltage Vcom from the longitudinal common line 22 is supplied the pixel common line pattern 23. The first transparent electrode pattern 152 electrically connects the longitudinal common line 22 exposed through a first common line contact hole 151a to the pixel common line pattern 23 exposed through a second common line contact hole 151b. The common electrode Ec1 is connected to the pixel common line pattern 23 through a first common electrode contact hole 153. The pixel electrode Ep1 is connected to a first TFT TFT1 through a first drain contact hole DCT1. The first TFT TFT1 supplies the first data voltage from the first data line D1 to the pixel electrode Ep1 in response to a scan pulse from the first gate line G1. A first storage capacitor is formed in an overlap area of the pixel electrode Ep1 and the pixel common line pattern 23 to keep a voltage during one frame at the first data voltage.

In the G liquid crystal cell of the first pixel, a common electrode Ec2 of the G liquid crystal cell includes a plurality of third fingers, that are formed parallel to the data lines and partially overlap the pixel common line pattern 23, and a third connection portion that partially overlaps the pixel common line pattern 23 to connect the third fingers to each other. A pixel electrode Ep2 of the G liquid crystal cell includes a plurality of fourth fingers, that are formed parallel to the data lines and are opposite to the third fingers on the same plane as the third fingers, and a fourth connection portion that partially overlaps the pixel common line pattern 23 to connect the fourth fingers to each other. The common electrode Ec2 is connected to the pixel common line pattern 23 through a second common electrode contact hole 154. The pixel electrode Ep2 is connected to a second TFT TFT2 through a second drain contact hole DCT2. The second TFT TFT2 supplies the third data voltage from the second data line D2 to the pixel electrode Ep2 in response to a scan pulse from the second gate line G2. A second storage capacitor is formed in an overlap area of the pixel electrode Ep2 and the pixel common line pattern 23 to keep a voltage during one frame at the third data voltage.

In the B liquid crystal cell of the first pixel, a common electrode Ec3 of the B liquid crystal cell includes a plurality of fifth fingers, that are formed parallel to the data lines and partially overlap the pixel common line pattern 23, and a fifth connection portion that partially overlaps the pixel common line pattern 23 to connect the fifth fingers to each other. A pixel electrode Ep3 of the B liquid crystal cell includes a plurality of sixth fingers, that are formed parallel to the data lines and are opposite to the fifth fingers on the same plane as the fifth fingers, and a sixth connection portion that partially overlaps the pixel common line pattern 23 to connect the sixth fingers to each other. A second transparent electrode pattern 156 is formed in the B liquid crystal cell so that the common voltage Vcom from the longitudinal common line 22 is supplied the pixel common line pattern 23. The second transparent electrode pattern 156 electrically connects the longitudinal common line 22 exposed through a third common line contact hole 155a to the pixel common line pattern 23 exposed through a fourth common line contact hole 155b. The common electrode Ec3 is connected to the pixel common line pattern 23 through a third common electrode contact hole 157. The pixel electrode Ep3 is connected to a third TFT TFT3 through a third drain contact hole DCT3. The third TFT TFT3 supplies the second data voltage from the second data line D2 to the pixel electrode Ep3 in response to a scan pulse from the first gate line G1. A third storage capacitor is formed in an overlap area of the pixel electrode Ep3 and the pixel common line pattern 23 to keep a voltage during one frame at the second data voltage.

A connection structure between the longitudinal common line 22 and the pixel common line pattern 23 in the R, G, and B liquid crystal cells of the second pixel is substantially the same as the connection structure in the R, G, and B liquid crystal cells of the first pixel, except connection locations between the gate lines and the TFTs. Therefore, a further description may be briefly made or may be entirely omitted.

Figure 15:
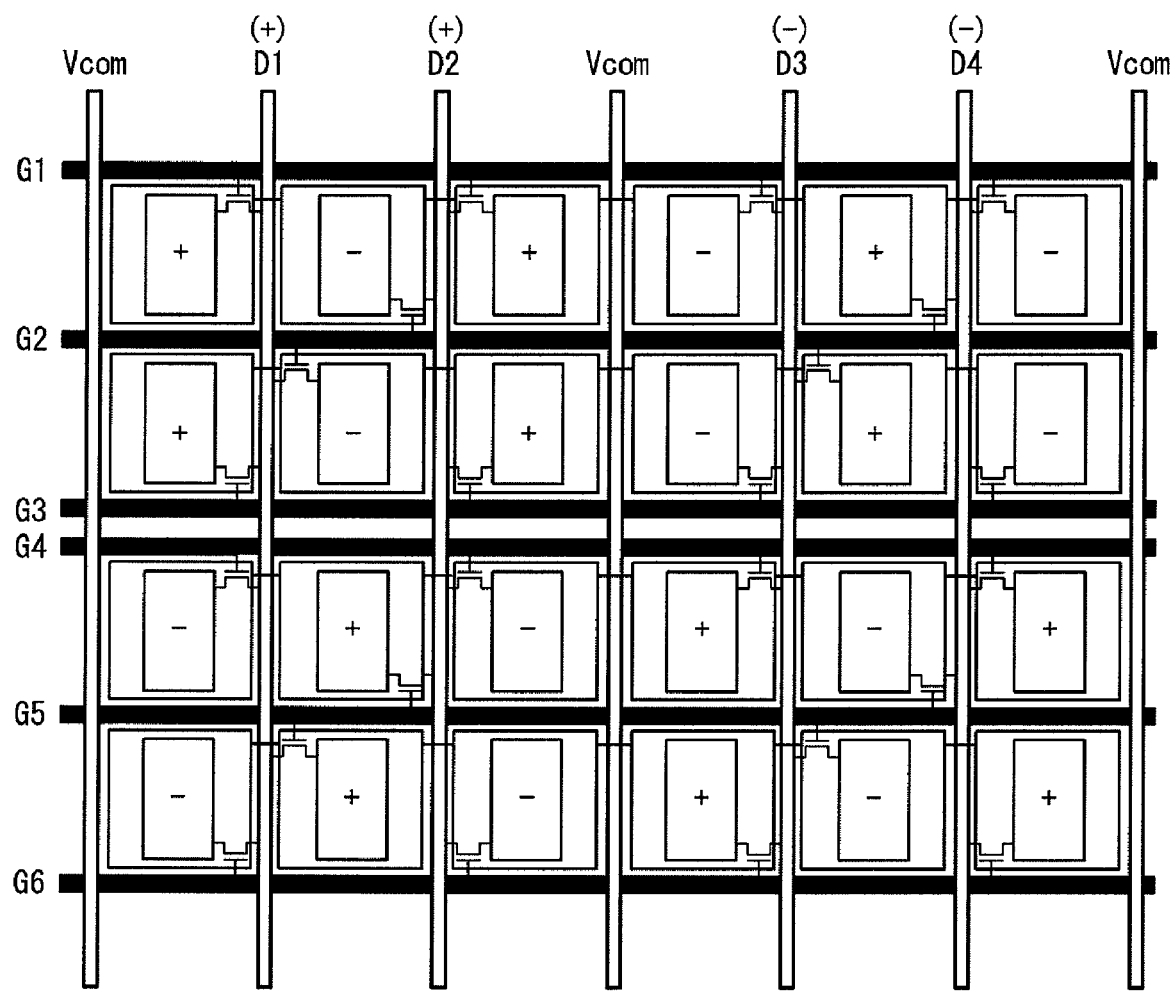
FIG. 15 illustrates an exemplary drive of the liquid crystal display panel shown in FIG. 8.
Figure 16:
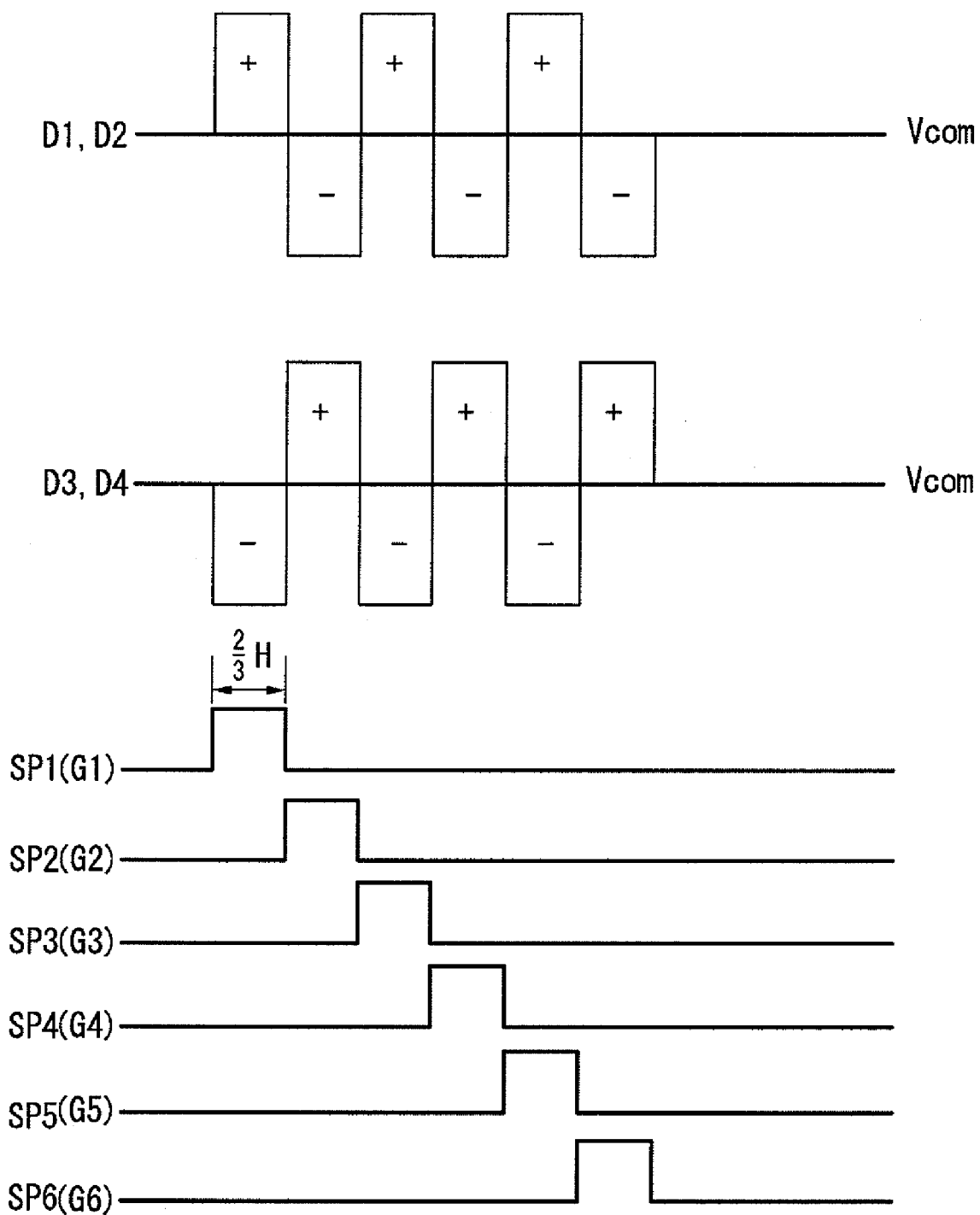
FIG. 16 illustrates a driving timing of scan pulses required in the drive of FIG. 15 and changes in polarities of voltages supplied to data lines synchronized with the scan pulses.

FIG. 15 illustrates an exemplary drive of the liquid crystal display panel 10 shown in FIG. 8. FIG. 16 illustrates a driving timing of scan pulses required in the drive of FIG. 15 and changes in polarities of voltages supplied to data lines synchronized with the scan pulses.

As shown in FIGS. 15 and 16, scan pulses SP1 to SP6 each having a width of about 2/3 horizontal period (2/3)H are sequentially generated and are supplied to first to sixth gate lines G1 to G6. A reason why the scan pulses SP1 to SP6 each have the width of about 2/3 horizontal period (2/3)H is to reduce scan time required to scan 1 horizontal line by increasing the number of gate lines (vertical resolution) required to drive pixels of 1 horizontal line to 1.5 times the number of gate lines generally required to drive pixels of 1 horizontal line. In addition, considering that a horizontal period is defined by a value obtained by dividing one frame period by a vertical resolution and a period during which a scan pulse is turned on is approximately equal to a horizontal period, a horizontal period can be reduced to 2/3 times by increasing a vertical resolution to 1.5 times. The data drive IC inverts polarities of data voltages, that are synchronized with the generation of the scan pulses SP1 to SP6 and are supplied to first to fourth data lines D1 to D4 every about 2/3 horizontal period (2/3)H, in a horizontal 2-dot inversion scheme. Supposing that the data voltages simultaneously generated by the data drive IC have a first polarity pattern (++−−), polarities of the data voltages supplied to the first to fourth data lines D1 to D4 have the first polarity pattern during a generation period of the odd-numbered scan pulses SP1, SP3, and SP5 and have a second polarity pattern (−−++) opposite the first polarity pattern during a generation period of the even-numbered scan pulses SP2, SP4, and SP6. Accordingly, polarities of the data voltages displayed on the liquid crystal display panel 10 are inverted through the TFTs connected in zigzags in the horizontal 2-dot inversion scheme.

Figure 17:
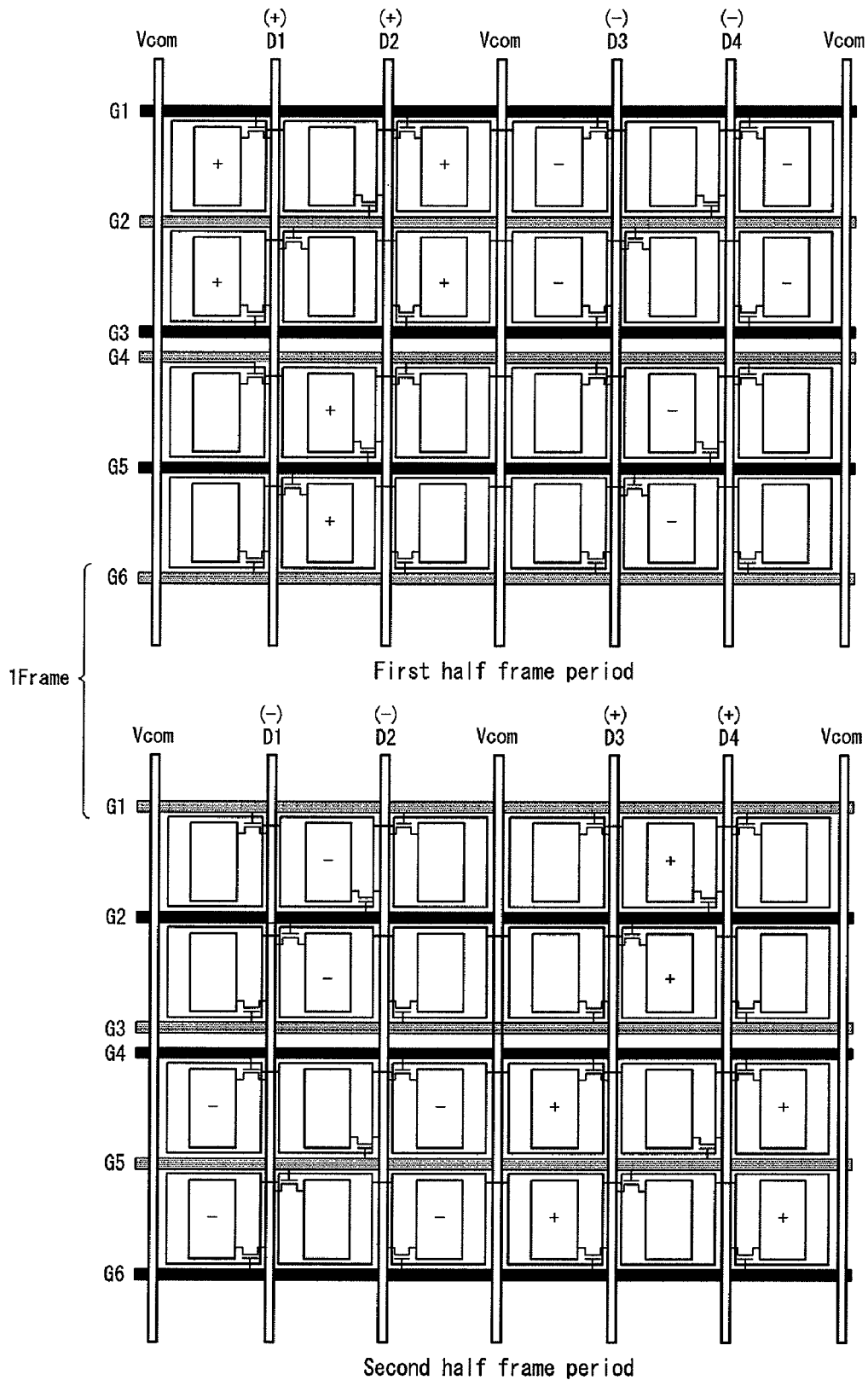
FIG. 17 illustrates another exemplary drive of the liquid crystal display panel shown in FIG. 8.
Figure 18:
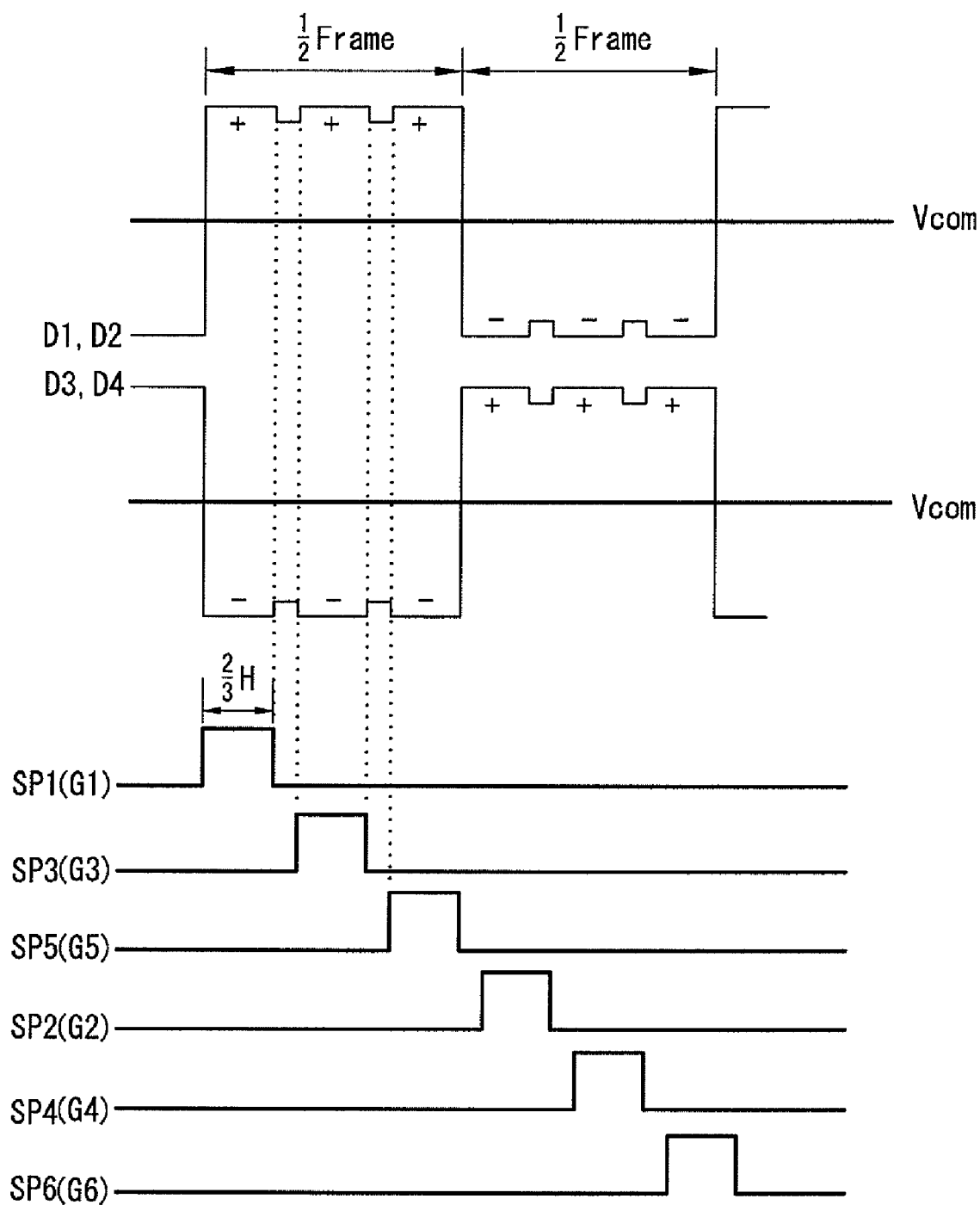
FIG. 18 illustrates a driving timing of scan pulses required in the drive of FIG. 17 and changes in polarities of voltages supplied to data lines synchronized with the scan pulses.

FIG. 17 illustrates another exemplary drive of the liquid crystal display panel 10 shown in FIG. 8. FIG. 18 illustrates a driving timing of scan pulses required in the drive of FIG. 17 and changes in polarities of voltages supplied to data lines synchronized with the scan pulses.

As shown in FIGS. 17 and 18, scan pulses SP1, SP3, and SP5 each having a width of about 2/3 horizontal period (2/3)H are sequentially generated and are supplied to odd-numbered gate lines G1, G3, and G5 during a first half frame period. Subsequently, scan pulses SP2, SP4, and SP6 each having a width of about 2/3 horizontal period (2/3)H are sequentially generated and are supplied to even-numbered gate lines G2, G4, and G6 during a second half frame period. For this, the gate drive IC allows cascade-connected odd-numbered stages S1, S3, and S5 to sequentially operate in response to the gate start pulse from the timing controller 11, and then cascade-connected even-numbered stages S2, S4, and S6 to sequentially operate in response to an output from the last stage S5 of the odd-numbered stages, so as to sequentially generate the odd-numbered scan pulses SP1, SP3, and SP5 and then sequentially generate the even-numbered scan pulses SP2, SP4, and SP6. The gate drive ICs may be formed at both sides of the non-display area of the liquid crystal display panel 10 so as to reduce a line load of the scan pulses. The first and second gate drive ICs may be formed on the lower glass substrate of the liquid crystal display panel through the same process as the TFTs inside the liquid crystal display panel 10 in a gate-in-panel (GIP) manner so as to simplify a manufacturing process.

The data drive IC inverts polarities of the data voltages supplied to first to fourth data lines D1 to D4 every half frame period in a frame inversion scheme in synchronization with the generation of the first odd-numbered scan pulse SP1 and the first even-numbered scan pulse SP2. Supposing that the data voltages simultaneously generated by the data drive IC have a first polarity pattern (++−−), polarities of the data voltages supplied to the first to fourth data lines D1 to D4 have the first polarity pattern during a generation period (i.e., during a first half frame period) of the odd-numbered scan pulses SP1, SP3, and SP5 and have a second polarity pattern (−−++) opposite the first polarity pattern during a generation period (i.e., during a second half frame period) of the even-numbered scan pulses SP2, SP4, and SP6. Accordingly, polarities of the data voltages displayed on the liquid crystal display panel 10 are inverted through the TFTs connected in zigzags in a vertical 2-dot inversion scheme.

Figure 19:
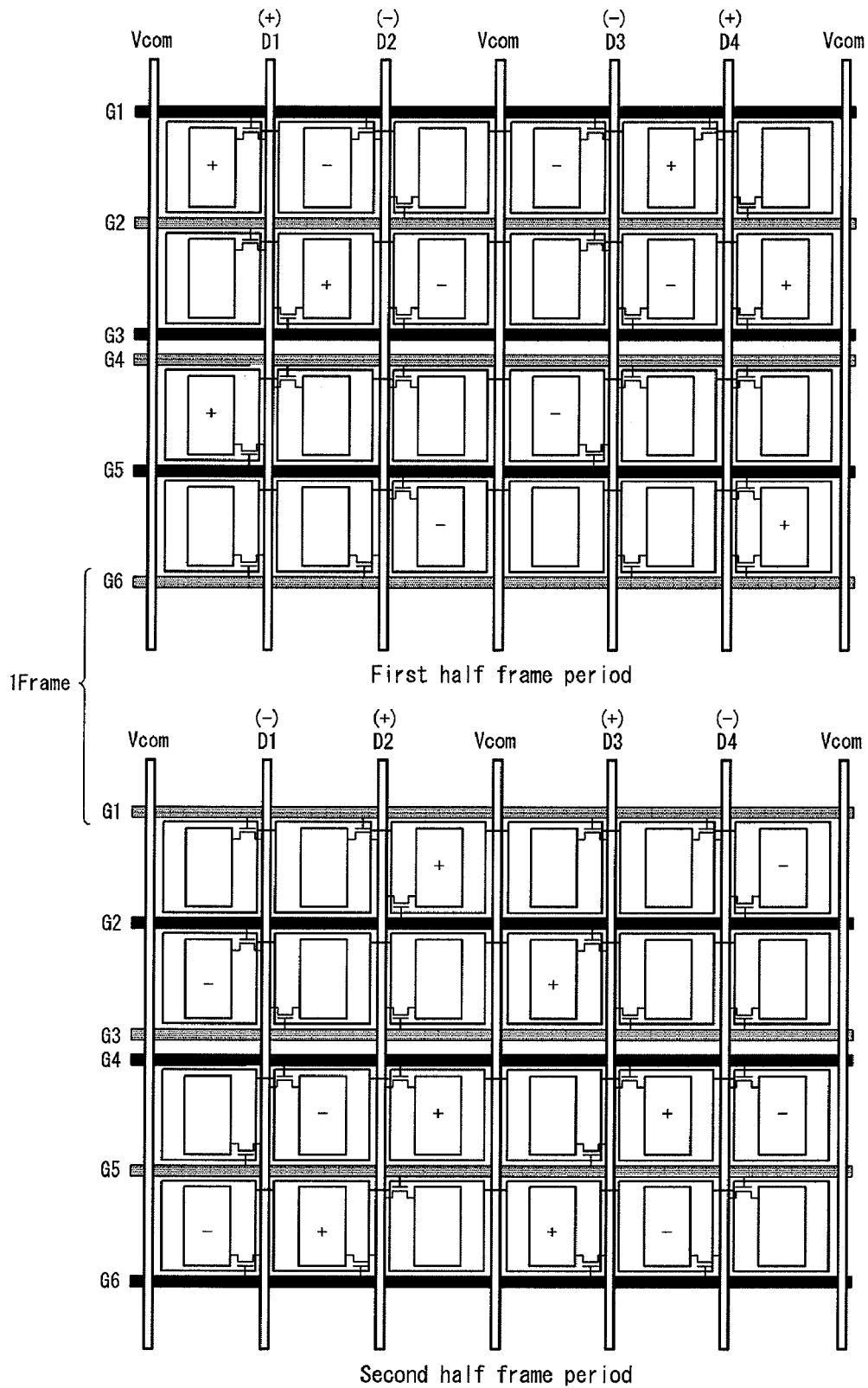
FIG. 19 illustrates an exemplary drive of a liquid crystal display panel in which a connection configuration of TFTs is different from a connection configuration of the TFTs shown in FIG. 8.
Figure 20:
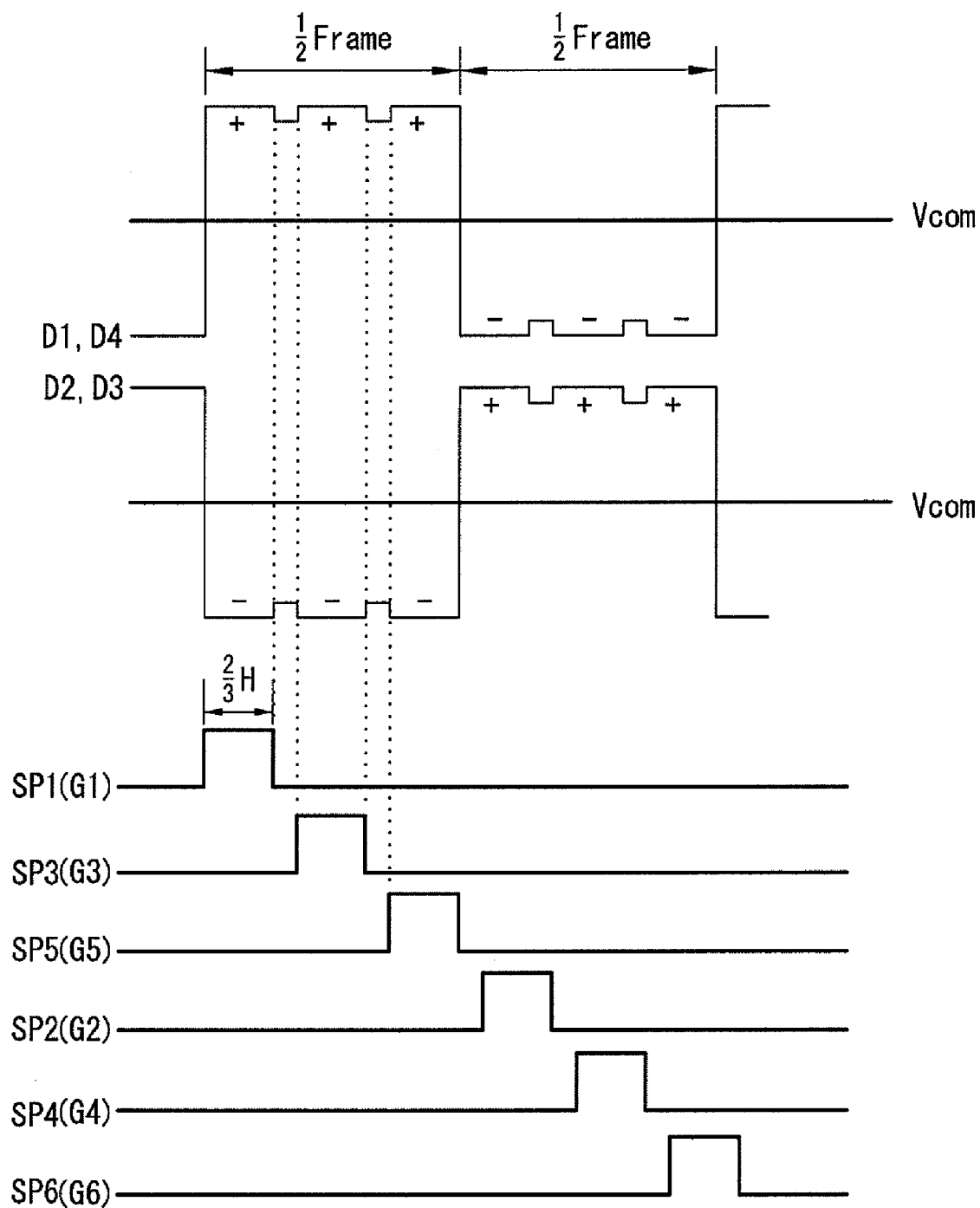
FIG. 20 illustrates a driving timing of scan pulses required in the drive of FIG. 19 and changes in polarities of voltages supplied to data lines synchronized with the scan pulses.

FIG. 19 illustrates an exemplary drive of the liquid crystal display panel 10 in which a connection configuration of the TFTs is different from a connection configuration of the TFTs in FIG. 8. FIG. 20 illustrates a driving timing of scan pulses required in the drive of FIG. 19 and changes in polarities of voltages supplied to data lines synchronized with the scan pulses.

As shown in FIG. 19, in a first pixel on a first horizontal line, R and G liquid crystal cells are connected to a first gate line G1, and a B liquid crystal cell is connected to a second gate line G2. In the first pixel, the R liquid crystal cell is charged to a first data voltage from a first data line D1 in response to a scan pulse from the first gate line G1, the G liquid crystal cell is charged to a second data voltage from a second data line D2 in response to a scan pulse from the first gate line G1, and the B liquid crystal cell is charged to a third data voltage from the second data line D2 in response to a scan pulse from the second gate line G2.

In a second pixel vertically adjacent to the first pixel on a second horizontal line, an R liquid crystal cell is connected to the second gate line G2, and G and B liquid crystal cells are connected to a third gate line G3. In the second pixel, the R liquid crystal cell is charged to a fourth data voltage from the first data line D1 in response to a scan pulse from the second gate line G2, the G liquid crystal cell is charged to a fifth data voltage from the second data line D2 in response to a scan pulse from the third gate line G3, and the B liquid crystal cell is charged to a sixth data voltage from the second data line D2 in response to a scan pulse from the third gate line G3.

In a third pixel vertically adjacent to the second pixel on a third horizontal line, an R liquid crystal cell is connected to a fifth gate line G5, and G and B liquid crystal cells are connected to a fourth gate line G4. In the third pixel, the G liquid crystal cell is charged to a seventh data voltage from the first data line D1 in response to a scan pulse from the fourth gate line G4, the B liquid crystal cell is charged to an eighth data voltage from the second data line D2 in response to a scan pulse from the fourth gate line G4, and the R liquid crystal cell is charged to a ninth data voltage from the first data line D1 in response to a scan pulse from the fifth gate line G5.

In a fourth pixel vertically adjacent to the third pixel on a fourth horizontal line, R and G liquid crystal cells are connected to a sixth gate line G6, and a B liquid crystal cell is connected to the fifth gate line G5. In the fourth pixel, the R liquid crystal cell is charged to a tenth voltage from the first data line D1 in response to a scan pulse from the sixth gate line G6, the G liquid crystal cell is charged to an eleventh data voltage from the second data line D2 in response to a scan pulse from the sixth gate line G6, and the B liquid crystal cell is charged to a twelfth data voltage from the second data line D2 in response to a scan pulse from the fifth gate line G5.

As shown in FIG. 20, scan pulses SP1, SP3, and SP5 each having a width of about 2/3 horizontal period (2/3)H are sequentially generated and are supplied to odd-numbered gate lines G1, G3, and G5 during a first half frame period. Subsequently, scan pulses SP2, SP4, and SP6 each having a width of about 2/3 horizontal period (2/3)H are sequentially generated and are supplied to even-numbered gate lines G2, G4, and G6 during a second half frame period.

The data drive IC inverts polarities of the data voltages supplied to first to fourth data lines D1 to D4 every half frame period in a frame inversion scheme in synchronization with the generation of the first odd-numbered scan pulse SP1 and the first even-numbered scan pulse SP2. Supposing that the data voltages simultaneously generated by the data drive IC have a first polarity pattern (+−−+), polarities of the data voltages supplied to the first to fourth data lines D1 to D4 have the first polarity pattern during a generation period (i.e., during a first half frame period) of the odd-numbered scan pulses SP1, SP3, and SP5 and have a second polarity pattern (−++−) opposite the first polarity pattern during a generation period (i.e., during a second half frame period) of the even-numbered scan pulses SP2, SP4, and SP6. Accordingly, polarities of the data voltages displayed on the liquid crystal display panel 10 are inverted through the TFTs connected in zigzags in a 1-dot inversion scheme.

The number of changes in the polarities of the data voltages generated inside the data drive IC in the drive of the liquid crystal display panel 10 shown in FIGS. 17 to 20 is reduced to one half of the number of changes in the polarities of the data voltages generated inside the data drive IC in the drive of the liquid crystal display panel 10 shown in FIGS. 15 and 16. Therefore, the load of the data drive IC can be reduced, and heat generation and power consumption can be reduced.

As described above, in the liquid crystal display according to the embodiments of the invention, the number of input sources for supplying the common voltage increases, and the common line including the longitudinal common lines and the pixel common line patterns is formed. Therefore, a reduction in the deviation of the common voltage over the entire surface of the liquid crystal display panel and a reduction in the resistance of the common line can be achieved. Further, a reduction in the image quality such as the crosstalk, the flicker, and DC image sticking caused by the distortion of the common voltage can be prevented through the distribution of the load of the common line.

Furthermore, in the liquid crystal display according to the embodiments of the invention, because the number of data lines required to achieve a predetermined resolution is reduced to 2/3 of the number of data lines generally required to achieve the predetermined resolution, as many data drive ICs as the reduced number of data lines are removed. Therefore, the manufacturing cost can be greatly reduced. In this case, in the liquid crystal display according to the embodiments of the invention, because two vertically adjacent pixels are driven by three gate lines scanned one half time faster than the conventional case, the number of data drive ICs can be efficiently reduced without causing the excessive heat generation or a reduction in the image quality.

Furthermore, in the liquid crystal display according to the embodiments of the invention, because each longitudinal common line receiving the common voltage is formed between not liquid crystal cells but pixels and the adjacent liquid crystal cells share the longitudinal common line, the aperture ratio increases by 10% or more as compared with the related art transverse common line. Hence, the luminance can be greatly improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:
 a liquid crystal display panel including a display area where pixels are arranged in a matrix format and a plurality of data lines and a plurality of gate lines are formed to cross each other;
 an edge common line that is formed in a non-display area outside the display area to receive a common voltage through a plurality of input sources;
 a plurality of pixel common line patterns that are formed in each of liquid crystal cells constituting each of the pixels and are electrically connected to one another, each of the pixel common line patterns having a mesh structure, the pixel common line patterns being connected to common electrodes of the liquid crystal cells;
 a plurality of longitudinal common lines that are electrically connected to the edge common line to apply the common voltage to the pixel common line patterns, each of the longitudinal common lines being formed between two horizontally adjacent pixels in a direction parallel to the data lines; and
 a plurality of data drive integrated circuits (ICs) for driving the data lines,
 wherein the pixels include a plurality of pixel units each including two vertically adjacent pixels, and two data lines and three gate lines are assigned to each of the pixel units,
 wherein the plurality of input sources include a plurality of common voltage input pads connected to dummy channels disposed at right and left sides of each of the data drive ICs,
 wherein two common voltage input pads are respectively connected to two dummy channels disposed at both sides of each data drive IC, and
 wherein a width of the edge common line is greater than a width of the longitudinal common lines, and the width of each longitudinal common line is smaller than a width of each data line.

2. The liquid crystal display of claim 1, wherein the edge common line and the pixel common line pattern have the same metal pattern as the gate lines, and
 wherein the longitudinal common lines have the same metal pattern as the data lines.

3. The liquid crystal display of claim 2, further comprising a connection pattern that electrically connects the edge common line to the longitudinal common lines through a first contact hole exposing the edge common line and a second contact hole exposing the longitudinal common lines.

4. The liquid crystal display of claim 2, wherein each of the pixel units includes:
 a first pixel including a first color liquid crystal cell connected to a first gate line, a second color liquid crystal cell connected to a second gate line adjacent to the first gate line, and a third color liquid crystal cell connected to the first gate line; and
 a second pixel including a first color liquid crystal cell connected to a third gate line adjacent to the second gate line, a second color liquid crystal cell connected to the second gate line, and a third color liquid crystal cell connected to the third gate line,
 wherein a first data line is connected to the first color liquid crystal cell of the first pixel and the first and second color liquid crystal cells of the second pixel, and a second data line adjacent to the first data line is connected to the second and third color liquid crystal cells of the first pixel and the third color liquid crystal cell of the second pixel.

5. The liquid crystal display of claim 4, wherein a pixel electrode and a common electrode of each of the first to third color liquid crystal cells of each of the first and second pixels are formed on the same substrate or are respectively formed on different substrates.

6. The liquid crystal display of claim 4, wherein scan pulses each having a width of 2/3 horizontal period are sequentially generated and are supplied to the gate lines,
 wherein the data drive IC inverts polarities of data voltages supplied to the data lines in synchronization with the generation of the scan pulses.

7. The liquid crystal display of claim 4, wherein scan pulses each having a width of 2/3 horizontal period are sequentially generated and are supplied to odd-numbered gate lines of the gate lines during a first half frame period, and scan pulses each having a width of 2/3 horizontal period are sequentially generated and are supplied to even-numbered gate lines of the gate lines during a second half frame period, wherein the data drive IC inverts polarities of data voltages supplied to the data lines in synchronization with the generation of a first scan pulse of the scan pulses supplied to the odd-numbered gate lines and the generation of a first scan pulse of the scan pulses supplied to the even-numbered gate lines.

8. The liquid crystal display of claim 2, wherein the pixel units include first and second pixel units that are vertically adjacent to each other, wherein the first pixel unit includes:

a first pixel including a first color liquid crystal cell connected to a first gate line, a second color liquid crystal cell connected to the first gate line, and a third color liquid crystal cell connected to a second gate line adjacent to the first gate line; and a second pixel including a first color liquid crystal cell connected to the second gate line, a second color liquid crystal cell connected to a third gate line adjacent to the second gate line, and a third color liquid crystal cell connected to the third gate line, wherein the second pixel unit includes:

a third pixel including a second color liquid crystal cell connected to a fourth gate line adjacent to the third gate line, a third color liquid crystal cell connected to the fourth gate line, and a first color liquid crystal cell connected to a fifth gate line adjacent to the fourth gate line; and a fourth pixel including a first color liquid crystal cell connected to a sixth gate line adjacent to the fifth gate line, a second color liquid crystal cell connected to the sixth gate line, and a third color liquid crystal cell connected to the fifth gate line, wherein a first data line is connected to the first color liquid crystal cell of the first pixel, the first and second color liquid crystal cells of the second pixel, the first and second color liquid crystal cells of the third pixel, and the first color liquid crystal cell of the fourth pixel, wherein a second data line adjacent to the first data line is connected to the second and third color liquid crystal cells of the first pixel, the third color liquid crystal cell of the second pixel, the third color liquid crystal cell of the third pixel, and the second and third color liquid crystal cells of the fourth pixel.

9. The liquid crystal display of claim 8, wherein a pixel electrode and a common electrode of each of the first to third liquid crystal cells of each of the first to fourth pixels are formed on the same substrate or are respectively formed on different substrates.

10. The liquid crystal display of claim 8, wherein scan pulses each having a width of 2/3 horizontal period are sequentially generated and are supplied to the gate lines, wherein the data drive IC inverts polarities of data voltages supplied to the data lines in synchronization with the generation of the scan pulses.

11. The liquid crystal display of claim 8, wherein scan pulses each having a width of 2/3 horizontal period are sequentially generated and are supplied to odd-numbered gate lines of the gate lines during a first half frame period, and scan pulses each having a width of 2/3 horizontal period are sequentially generated and are supplied to even-numbered gate lines of the gate lines during a second half frame period, wherein the data drive IC inverts polarities of data voltages supplied to the data lines in synchronization with the generation of a first scan pulse of the scan pulses supplied to the odd-numbered gate lines and the generation of a first scan pulse of the scan pulses supplied to the even-numbered gate lines.

\* \* \* \* \*